(12) United States Patent
Xia et al.

(10) Patent No.: US 11,616,656 B2
(45) Date of Patent: Mar. 28, 2023

(54) MULTICAST DATA TRANSMISSION METHOD, RELATED APPARATUS, AND SYSTEM

(71) Applicant: Huawei Technologies Co., Ltd., Shenzhen (CN)

(72) Inventors: Nu Xia, Nanjing (CN); Jian Chen, Nanjing (CN); Xia Zhu, Nanjing (CN); Naiwen Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 48 days.

(21) Appl. No.: 17/090,616

(22) Filed: Nov. 5, 2020

(65) Prior Publication Data
US 2021/0058260 A1 Feb. 25, 2021

Related U.S. Application Data

(63) Continuation of application No. PCT/CN2019/085739, filed on May 7, 2019.

(30) Foreign Application Priority Data

May 8, 2018  (CN) .......................... 201810434350.7
May 24, 2018  (CN) .......................... 201810507664.5

(51) Int. Cl.
*H04L 12/18* (2006.01)
*H04L 45/02* (2022.01)
(Continued)

(52) U.S. Cl.
CPC .............. *H04L 12/18* (2013.01); *H04L 45/04* (2013.01); *H04L 45/74* (2013.01); *H04L 67/1095* (2013.01)

(58) Field of Classification Search
CPC ..... H04L 12/18; H04L 12/4633; H04L 45/04; H04L 45/16; H04L 45/34; H04L 45/50; H04L 45/507; H04L 45/74; H04L 67/1095
See application file for complete search history.

(56) References Cited

U.S. PATENT DOCUMENTS

2013/0028099 A1  1/2013 Birajdar et al.
2015/0078377 A1  3/2015 Wijnands et al.
(Continued)

FOREIGN PATENT DOCUMENTS

CN      106209629 A    12/2016
CN      106341327 A    1/2017
(Continued)

OTHER PUBLICATIONS

E. Rosen et al, "Multicast VPN Using BIER," draft-ietf-bier-mvpn-09, Internet Engineering Task Force, Nov. 13, 2017, 17 pages.
(Continued)

*Primary Examiner* — Mansour Oveissi
(74) *Attorney, Agent, or Firm* — Conley Rose, P.C.

(57) ABSTRACT

A multicast data transmission method includes: determining, by a first BFIR in a first BIER domain, a BIFT-id and a bitstring that correspond to multicast data in a second BIER domain, where the BIFT-id is determined based on at least an SI to which a BFR-id of a first BFER belongs and a BSL supported by the first BFER, and the first BFER is a BFER in the second BFER domain that is used to receive the multicast data; encapsulating the multicast data into a BIER data packet, where a BIER header of the BIER data packet includes the BIFT-id and the bitstring that correspond to the multicast data in the second BIER domain; and finally
(Continued)

sending the labeled BIER data packet to a second BFIR, where the label is a label corresponding to a prefix of the second BFIR.

20 Claims, 27 Drawing Sheets

(51) Int. Cl.
*H04L 45/74* (2022.01)
*H04L 67/1095* (2022.01)

(56) References Cited

U.S. PATENT DOCUMENTS

| | | | |
|---|---|---|---|
| 2015/0078378 A1* | 3/2015 | Wijnands | H04L 45/74 370/390 |
| 2015/0139228 A1 | 5/2015 | Wijnands et al. | |
| 2016/0087890 A1 | 3/2016 | Przygienda et al. | |
| 2016/0134535 A1 | 5/2016 | Callon | |
| 2016/0191372 A1 | 6/2016 | Zhang et al. | |
| 2017/0126481 A1 | 5/2017 | Pignataro et al. | |
| 2018/0205636 A1 | 7/2018 | Hu et al. | |
| 2018/0367456 A1* | 12/2018 | Wijnands | H04L 12/1854 |
| 2021/0092046 A1* | 3/2021 | Xiong | H04L 45/507 |

FOREIGN PATENT DOCUMENTS

| | | | | |
|---|---|---|---|---|
| CN | 106572017 | A | 4/2017 | |
| CN | 106572023 | A | 4/2017 | |
| CN | 107294859 | A | 10/2017 | |
| CN | 107592262 | A | 1/2018 | |
| CN | 3734906 | * | 4/2020 | H04L 12/18 |
| EP | 3361682 | A1 | 8/2018 | |
| EP | 3364614 | A1 | 8/2018 | |
| KR | 20140040250 | A | 4/2014 | |

OTHER PUBLICATIONS

Wijnands, IJ., Ed., et al, "Multicast using Bit Index Explicit Replication," draft-ietf-bier-architecture-07, Jun. 21, 2017, 38 pages.

Rosen, E., Ed. et al, "Multicast VPN Using BIER," draft-ietf-bier-mvpn-08, Oct. 16, 2017, 17 pages.

Wijnands, IJ., Ed. et al, "Encapsulation for Bit Index Explicit Replication (BIER) in MPLS and Non-MPLS Networks," RFC 8296, Jan. 2018, 24 pages.

Rosen, E., Ed. et al, "Multicast VPN Using Bit Index Explicit Replication (BIER)," RFC 8556, Apr. 2018, 17 pages.

Wijnands, IJ., Ed., et al., "Multicast Using Bit Index Explicit Replication (BIER)," RFC 8279, Nov. 2017, 43 pages.

* cited by examiner

MULTICAST DATA TRANSMISSION METHOD, RELATED APPARATUS, AND SYSTEM

CROSS-REFERENCE TO RELATED APPLICATIONS

This is a continuation of Int'l Patent App. No. PCT/CN2019/085739 filed on May 7, 2019, which claims priority to Chinese Patent App. No. 201810434350.7 filed on May 8, 2018 and Chinese Patent App. No. 201810507664.5 filed on May 24, 2018, which are incorporated by reference.

FIELD

This disclosure relates to the field of multicast technologies, and in particular, to a multicast data transmission method, a related apparatus, and a system.

BACKGROUND

With development of big video services such as internet video services, virtual reality (VR), and augmented reality (AR), traffic replication and backup within a data center (DC) and between DCs, and application of distributed storage, multicast service demands increase exponentially. A conventional multicast technology brings exponential growth in multicast tables, multicast statuses, and the like on an intermediate network, becoming the most complex and uncontrollable part of a multicast network.

A bit index explicit replication (BIER) technology provides a very simple way to solve a problem of multicast forwarding on the intermediate network, and can perform multicast distribution efficiently. This resolves a major problem in the multicast technology. For the BIER technology, refer to I J. Wijnands, et al., "Multicast using Bit Index Explicit Replication," Jun. 21, 2017. BIER is a typical representation of stateless multicast protocols, and has the following characteristics: 1. A protocol used for explicitly creating a multicast distribution tree is not needed; and 2. No intermediate node is needed to maintain any per-flow state.

The BIER technology may be combined with various virtual private networks (VPNs), such as a multicast virtual private network (MVPN), a layer-3 virtual private network (L3VPN), and an Ethernet virtual private network (EVPN), to implement complete VPN multicast. The MVPN goes beyond the conventional VPN and makes full use of the ubiquitous internet to provide two excellent distinct choices: a virtual private intranet and a virtual private wide area network. This can seamlessly, securely, and simply connect regions and users. The MVPN becomes an important bridge for remote interconnection of enterprises. Therefore, the BIER needs to provide full support for the MVPN.

However, in an existing solution combining the BIER technology and the MVPN, multicast transmission has problems of long convergence time and poor timeliness.

SUMMARY

This disclosure provides a multicast data transmission method, a related apparatus, and a system, to significantly shorten a convergence time of multicast transmission and improve timeliness of multicast transmission.

According to a first aspect, a multicast data transmission method is applied to a bit-forwarding ingress router (BFIR) on a multicast source side. The method may include: determining, by a first BFIR in a first BIER domain, a bit index forwarding table identifier (BIFT-id) and a bitstring that correspond to multicast data in a second BIER domain, where the BIFT-id is determined based on at least a subset identifier (SI) to which a BFR-id of a first bit-forwarding egress router (BFER) belongs and a bitstring length (BSL) supported by the first BFER, the bitstring is determined based on at least the bit-forwarding router (BFR) identifier (BFR-id for short) of the first BFER, and the first BFER is a BFER in the second BIER domain that is used to receive the multicast data; then, encapsulating, by the first BFIR, the multicast data into a BIER data packet, where a BIER header of the BIER data packet includes the BIFT-id and the bitstring that correspond to the multicast data in the second BIER domain; and finally labeling, by the first BFIR, the BIER data packet, and sending the labeled BIER data packet to a second BFIR, where the label is a label corresponding to a prefix of the second BFIR in the second BIER domain.

In the first aspect, the first BIER domain is a BIER domain in which a sender is located, and the second BIER domain is a BIER domain in which the sender is not located, and may be referred to as another BIER domain. The first BFIR is the sender, and is a BFIR on a multicast source side. The second BFIR is a BFIR in the another BIER domain. The first BFER is a BFER in the another BIER domain that is used to receive the multicast data, that is, a BFER in the another BIER domain that is interested in a multicast group corresponding to the multicast data. The label may be a multi-protocol label switching (MPLS) label or a generic routing encapsulation (GRE) label.

It can be seen that, for the multicast data to be sent to the another BIER domain, the sender performs BIER encapsulation on the multicast data to obtain the BIER data packet, adds the label (such as the MPLS label or the GRE label) to the BIER data packet, and then unicasts the BIER data packet to a BFIR in the another BIER domain.

Then, multicast data forwarding in the BIER domain complies with an existing BIER mechanism forwarding mechanism. For details, refer to an existing BIER-MVPN solution described in E. Rosen, et al., "Multicast VPN Using BIER," Oct. 16, 2017. It may be understood that different from the existing BIER-MVPN solution, multicast data forwarding in this disclosure is not segmental. The BIER header is constructed only on a sender side, and an intermediate device (for example, a BFIR and a BFER of each BIER domain along a path) is not required to participate in generation of the BIER header any more. In this way, multicast forwarding is more efficient.

In the first aspect, in some optional embodiments, the sender may specifically determine, from a first mapping table, the bitstring and the BIFT-id that correspond to the multicast data in the second BIER domain. Herein, the first mapping table may include a BIFT-id and a bitstring that correspond to the multicast data in the at least one BIER domain. The at least one BIER domain includes the second BIER domain.

With reference to the first aspect, in some optional embodiments, before labeling the BIER data packet, the sender may further determine a prefix of a logical next hop of the sender in the second BIER domain. The logical next hop of the sender in the second BIER domain is the second BFIR. In this way, for the another BIER domain, the sender can independently determine a next hop (that is, use the BFIR of the another BIER domain as the next hop), instead of using a directly adjacent BFR (that is, a BFR-NBR) as the next hop, so that the multicast data to be sent to the another BIER domain does not need to be forwarded by a BFR in the BIER domain in which the sender is located. Therefore, the multicast data can be directly sent to the BFIR in the another BIER domain after MPLS or GRE encapsulation, and forwarding efficiency is improved.

In the first aspect, in some optional embodiments, the sender may specifically determine a prefix of a logical next hop of the sender in the second BIER domain from a second mapping table based on the BIFT-id that corresponds to the multicast data in the second BIER domain. The prefix of the logical next hop of the sender in the second BIER domain is a prefix corresponding to the BIFT-id that corresponds to the multicast data in the second BIER domain. Herein, the second mapping table may include a BIFT-id that respectively corresponds to the multicast data in at least one BIER domain and a prefix of a logical next hop of the first BFIR in the at least one BIER domain.

The following describes how to determine the BIFT-id, the bitstring, the first mapping table, and the second mapping table.

(1) First, the sender can know which BFERs in the BIER domain are interested in the multicast group through multicast information advertisement and feedback. The sender forms a Border Gateway Protocol (BGP) peer with each of a BFIR and a BFER in the another BIER domain. The multicast information advertisement and feedback may include the following content.

1. Multicast Information Advertisement

The sender may directly send a BGP message to the BFIR and the BFER in the another BIER domain through a BGP connection, where the BGP message carries an P-multicast service interface (PMSI) auto-discovery (A-D) route used to advertise multicast information (for example, a multicast group address). The intra PMSI A-D route may carry a BIER identifier and an identifier of a multicast group corresponding to the multicast data (for example, a multicast group address 232.1.1.1). Herein, the BIER identifier is used to indicate that the BGP message carrying the intra PMSI A-D route is a BIER multicast message.

2. Multicast Information Feedback

Correspondingly, if being interested in the multicast group, the BFIR and BFER in the another BIER domain each may directly send a BGP message carrying a leaf auto-discovery route (Leaf A-D route) to the sender through the BGP connection. Correspondingly, the sender receives the BGP message from each of the BFIR and the BFER in the another BIER domain through the BGP connection, where the BGP message carries the leaf A-D route.

To enable the sender to know which BFERs in the BIER domain are interested in the multicast group and know how to forward the multicast data to the BFERs, the leaf A-D route may carry the following information.

First, the leaf A-D route fed back by the BFER (that is, the first BFER) in the another BIER domain may carry a BFR-id of the first BFER, a sub-domain to which the first BFER belongs, an SI to which the BFR-id of the first BFER belongs, a BSL supported by the first BFER, and an identifier of the BIER domain to which the first BFER belongs. Specifically, a field used to carry the sub-domain, the SI, the BSL, and the BFR-id may be added to the leaf A-D route, and an extended community attribute ("Source-AS extended community") is enabled to indicate the identifier of the BIER domain. In this way, the sender can determine a BIFT-id based on the three parameters: the sub-domain, the SI, and the BSL, and can generate a bitstring based on the BFR-id. In other words, the BFR-id of the BFER in the another BIER domain, the SI to which the BFR-id belongs, and the identifier of the another BIER domain may be used by the sender to determine the BIFT-id and the bitstring that correspond to the multicast data in the another BIER domain. Then, the sender can generate a first mapping table based on the identifier of the BIER domain, the BIFT-id, and the bitstring. For details, refer to subsequent content.

In a possible case, one BIER domain is configured with only one sub-domain. In this case, the BIFT-id may be determined based on only the two parameters: the SI and the BSL. Therefore, the leaf A-D route fed back by the first BFER does not need to carry the sub-domain to which the BFER belongs.

In a possible case, BSLs supported by entire multicast domains may be the same, that is, no additional notification is required, and the sender also knows the BSL. Therefore, the leaf A-D route fed back by the first BFER does not need to carry the BSL.

Second, the leaf A-D route fed back by the BFIR (that is, the second BFIR) in the another BIER domain may carry a BFR-prefix of the second BFIR and an identifier of the BIER domain to which the second BFIR belongs. The prefix of the BFIR in the another BIER domain and the identifier of the another BIER domain are used by the sender to determine a prefix of a logical next hop of the multicast data in the another BIER domain. In this way, the sender can generate a second mapping table of the sender based on the information. For details, refer to subsequent content.

It can be seen that edge BFRs between different BIER domains establish a BGP peer, and can directly exchange a BGP message through a BGP connection, to implement fast advertisement and fast feedback of the multicast information. In other words, multicast information advertisement and feedback do not require segment-by-segment BGP message exchange any more, but the BGP message is directly exchanged across domains. Therefore, a convergence time of the multicast advertisement and feedback is significantly shortened, and efficiency is high.

(2) The Sender Determines the BIFT-Id.

Specifically, the sender may determine, based on a sub-domain, an SI, and a BSL carried in a leaf A-D route from each BIER domain, a BIFT-id that respectively corresponds to a specific multicast group in each BIER domain. The BIFT-id is used by BFRs (including a BFIR and a transit BFR) in each BIER domain to forward the multicast data based on a bit index forwarding table (BIFT) identified by the BIFT-id. The BIFT-id is an index with a fixed length (for example, 20 bits), and is determined based on the three parameters: the sub-domain, the SI, and the BSL. If one BIER domain is configured with only one sub-domain, the sub-domain is optional.

It can be seen that, like the parameters for determining the BIFT-id in the another BIER domain, the sender also determines the BIFT-id that corresponds to the specific multicast group in the another BIER domain based on the sub-domain, the SI, and the BSL. This means that the sender can construct a BIFT-id that can be used for BIER routing and forwarding in the another BIER domain. Entire multicast domains (a plurality of BIER domains) determine the BIFT-id together. In this way, the sender can generate a BIER data packet that is to be successfully routed and forwarded in the another BIER domain.

It should be noted that, a BIFT-id that respectively corresponds to the specific multicast group in each BIER domain is a BIFT-id that respectively corresponds to multicast data corresponding to the specific multicast group in each BIER domain.

(3) The Sender Determines the Bitstring.

Specifically, the sender may determine, based on a BFR-id carried in a leaf A-D route from each BIER domain, a bitstring that respectively corresponds to the specific multicast group in each BIER domain. The bitstring is used by the BFRs (including the BFIR and the transit BFR) in each BIER domain to forward the multicast data to a BFER (that is, a receiver) identified by the bitstring.

(4) The Sender Generates the First Mapping Table.

Specifically, the sender generates the first mapping table based on a BIER domain identifier of each BIER domain, a BIFT-id, and a bitstring. The first mapping table may include a BIFT-id and a bitstring that correspond to specific multicast data in the at least one BIER domain. The at least one BIER domain may include a BIER domain in which the sender is located and a BIER domain (that is, the another BIER domain) in which the sender is not located. The first mapping table may include a correspondence between a multicast group identifier (for example, a multicast group address) and an identifier of a BIER domain, a BIFT-id, and a bitstring. An identifier of a BIER domain, a BIFT-id, and a bitstring that correspond to a multicast group identifier represent, in the BIER domain represented by the identifier of the BIER domain, a BIFT-id and a bitstring that correspond to multicast data corresponding to the multicast group identifier.

The first mapping table may be used to construct the BIER header. For multicast data of a multicast group, a BIER header of the multicast data is constructed only on a sender side, and no intermediate device is required to participate in reconstruction of the BIER header.

(5) The Sender Generates the Second Mapping Table.

For the another BIER domain, the sender independently determines a next hop (that is, uses the BFIR in the another BIER domain as the next hop), instead of using a directly adjacent BFR (that is, a BFR-NBR) as the next hop.

For a specific second BIER domain, next hops of the sender in the BIER domain may be a plurality of BFIRs in the BIER domain, that is, there are a plurality of next hops. A part of the plurality of BFIRs may be responsible for forwarding the multicast data to some sub-domains in the BIER domain, and the other part of the plurality of BFIRs may be responsible for forwarding the multicast data to some other sub-domains in the BIER domain. In this way, for the multicast data to be sent to the BIER domain, the sender may determine, based on a BIFT-id (a BIFT-id is in one-to-one correspondence with a sub-domain) that corresponds to the multicast data in the BIER domain, a BFIR to which the multicast data is to be forwarded. Because the BIFT-id can indicate a sub-domain to which the multicast data is to be sent. That the plurality of BFIRs are respectively responsible for forwarding the multicast data to which sub-domain (or sub-domains) is not limited and may be determined based on an actual requirement. For example, a data forwarding volume carried by each of the plurality of next hops may be set from a perspective of load balancing.

For a specific other BIER domain, a next hop of the sender in the BIER domain may be one BFIR in the BIER domain, that is, there is only one next hop. The BFIR may be responsible for forwarding the multicast data to all target sub-domains in the BIER domain. Herein, the target sub-domain is a sub-domain in which a receiver of the multicast data is located.

The sender may generate the second mapping table based on the independently determined next hop. The second mapping table may include a BIFT-id that respectively corresponds to the multicast group in at least one BIER domain and a BFR-prefix of a next hop of the sender in the at least one BIER domain. The at least one BIER domain may include a BIER domain in which the sender is located and a BIER domain (that is, the another BIER domain) in which the sender is not located. In the BIER domain in which the sender is located, referring to the existing BIER-MVPN solution, the next hop of the sender may be a BFR-NBR. In the another BIER domain, the next hop of the sender may be the BFIR of the another BIER domain.

Optionally, the second mapping table may include a correspondence between a multicast group identifier (for example, a multicast group address) and an identifier of a BIER domain, a BIFT-id, and a BFR-prefix. An identifier of a BIER domain, a BIFT-id, and a BFR-prefix that correspond to a multicast group identifier represent, in the BIER domain represented by the identifier of the BIER domain, a BIFT-id and a BFR-prefix of a logical next hop that correspond to multicast data corresponding to the multicast group identifier.

Optionally, the second mapping table may be alternatively a correspondence between a BIFT-id and a BFR-prefix. In this way, the sender may find, by using a BIFT-id found in the first mapping table, a BFR-prefix corresponding to the BIFT-id in the second mapping table.

For a specific other BIER domain, when the sender has a plurality of next hops in the BIER domain, (one or more) BIFT-ids corresponding to a domain identifier of the BIER domain in the second mapping table correspond to a plurality of BFR-prefixes; or when the sender has only one next hop in the BIER domain, (one or more) BIFT-ids corresponding to a domain identifier of the BIER domain in the second mapping table correspond to one BFR-prefix.

The second mapping table may be used to add an MPLS label or a GRE label to a BIER data packet obtained by encapsulating the multicast data, to implement cross-domain (inter-domain) forwarding.

Optionally, the sender may configure an egress port for sending the multicast data to at least one BIER domain. The second mapping table may further include an identifier of the egress port. In this way, the sender may determine, from the second mapping table based on the BIFT-id that corresponds to the multicast data in the another BIER domain, an identifier of an egress port used to send the multicast data to the another BIER domain. Herein, the egress port used to send the multicast data to the another BIER domain may be referred to as a first port.

According to a second aspect, a multicast data transmission method is applied to a BFIR in another BIER domain. The method may include: receiving, by a first BFIR in a first BIER domain, a labeled BIER data packet sent by a second BFIR in a second BIER domain, where the label is a label corresponding to a prefix of the first BFIR, the BIER data packet is obtained by encapsulating multicast data by the second BFIR, and a BIER header of the BIER data packet includes a BIFT-id and a bitstring that correspond to the multicast data in the first BIER domain. The BIFT-id is determined based on at least an SI to which a BFR-id of the first BFER belongs and a bitstring length supported by the first BFER, and the bitstring is determined based on at least the BFR-id of the first BFER. The first BFER is a BFER used for receiving the multicast data in the first BIER domain. Then, the first BFIR may remove the label to obtain the BIER data packet, and obtain the BIFT-id and the bitstring from the BIER header of the BIER data packet. Finally, the first BFIR may forward the BIER data packet to the first BFER based on a BIFT indicated by the BIFT-id and the bitstring.

In the second aspect, the first BIER domain is a BIER domain in which a sender is not located, and the second BIER domain is a BIER domain in which the sender is located. The first BFIR is a BFIR in the first BIER domain. The second BFIR is the sender, and is a BFIR on a multicast source side. The first BFER is a BFER used for receiving the multicast data in the first BIER domain. The label may be an MPLS label or a GRE label.

It can be seen that, for the multicast data to be sent to the another BIER domain, the sender performs BIER encapsulation on the multicast data to obtain the BIER data packet, adds the MPLS label or the GRE label to the BIER data packet, and then unicasts the BIER data packet to a BFIR in the another BIER domain.

Then, multicast data forwarding in the BIER domain complies with an existing BIER mechanism forwarding mechanism. Different from an existing BIER-MVPN solution, multicast data forwarding in this disclosure is not segmental. The BIER header is constructed only on a sender side, and an intermediate device (for example, a BFIR and a BFER of each BIER domain along a path) is not required to participate in generation of the BIER header any more. In this way, multicast forwarding is more efficient.

With reference to the second aspect, in some optional embodiments, the BIFT-id that corresponds to the multicast data in the first BIER domain is further determined based on a sub-domain to which the first BFER belongs. Optionally, in a possible case, one BIER domain is configured with only one sub-domain. In this case, the BIFT-id may be determined based on only the two parameters the SI and the BSL. Therefore, a leaf A-D route fed back by the first BFER does not need to carry the sub-domain to which the BFER belongs.

With reference to the second aspect, in some optional embodiments, the second BFIR and the first BFIR form a BGP peer. The method may further include: receiving, by the first BFIR through a BGP connection, a first BGP message sent by the second BFIR, where an intra PMSI A-D route carried in the first BGP message includes a BIER identifier and an identifier of a multicast group corresponding to the multicast data. Correspondingly, the first BFIR sends a second BGP message to the second BFIR through the BGP connection, where a leaf A-D route carried in the second BGP message includes the prefix of the first BFIR and an identifier of the first BIER domain. In this way, the sender can generate a second mapping table of the sender based on the information. For details, refer to related content described in the first aspect.

In other words, BFIRs in different BIER domains establish a BGP peer, and can directly exchange a BGP message through a BGP connection, to implement fast advertisement and fast feedback of the multicast information. In other words, multicast information advertisement and feedback do not require segment-by-segment BGP message exchange any more, but the BGP message is directly exchanged across domains. Therefore, a convergence time of the multicast advertisement and feedback is significantly shortened, and efficiency is high.

According to a third aspect, a multicast data transmission method is applied to a BFER on a user equipment side. The method may include: receiving, by a first BFER in a first BIER domain, a BIER data packet sent by a first BFIR in the first BIER domain, where the BIER data packet is obtained by encapsulating multicast data by a second BFIR in the second BIER domain, and a BIER header of the BIER data packet includes a BIFT-id and a bitstring that correspond to the multicast data in the first BIER domain. The BIFT-id is determined based on at least an SI to which a BFR-id of the first BFER belongs and a bitstring length supported by the first BFER, and the bitstring is determined based on at least the BFR-id of the first BFER. The first BFER is a BFER used for receiving the multicast data in the first BIER domain. Then, the first BFER decapsulates the BIER data packet to obtain the multicast data, and sends the multicast data to a user side device.

In the third aspect, the first BIER domain is a BIER domain in which a sender is not located, and the second BIER domain is a BIER domain in which the sender is located. The first BFIR is a BFIR in the first BIER domain. The second BFIR is the sender, and is a BFIR on a multicast source side. The first BFER is a BFER used for receiving the multicast data in the first BIER domain. The label may be an MPLS label or a GRE label.

It can be seen that, for the multicast data to be sent to another BIER domain, the sender performs BIER encapsulation on the multicast data to obtain the BIER data packet, adds the MPLS label or the GRE label to the BIER data packet, and then unicasts the BIER data packet to a BFIR in the another BIER domain.

Then, multicast data forwarding in the BIER domain complies with an existing BIER mechanism forwarding mechanism. Different from an existing BIER-MVPN solution, multicast data forwarding in this disclosure is not segmental. The BIER header is constructed only on a sender side, and an intermediate device (for example, a BFIR and a BFER of each BIER domain along a path) is not required to participate in generation of the BIER header any more. In this way, multicast forwarding is more efficient.

With reference to the third aspect, in some optional embodiments, the second BFIR and the first BFER form a BGP peer. The method may further include: receiving, by the first BFER through a BGP connection, a first BGP message sent by the second BFIR, where an intra PMSI A-D route carried in the first BGP message includes a BIER identifier and an identifier of a multicast group corresponding to the multicast data. Correspondingly, the first BFER sends a second BGP message to the second BFIR through the BGP connection, where a leaf A-D route carried in the second BGP message includes the BFR-id of the first BFER, the SI to which the BFR-id of the first BFER belongs, and an identifier of the first BIER domain. In this way, the sender can generate a first mapping table based on the information. For details, refer to related content described in the first aspect.

In other words, the sender and a BFER in the another BIER domain establish a BGP peer, and can directly exchange a BGP message through the BGP connection, to implement fast advertisement and fast feedback of multicast information. In other words, multicast information advertisement and feedback do not require segment-by-segment BGP message exchange any more, but the BGP message is directly exchanged across domains. Therefore, a convergence time of the multicast advertisement and feedback is significantly shortened, and efficiency is high.

With reference to the third aspect, in some optional embodiments, the BIFT-id that corresponds to the multicast data in the first BIER domain is further determined based on a sub-domain to which the first BFER belongs. Optionally, the leaf A-D route fed back by the first BFER may further carry the sub-domain to which the first BFER belongs. In other words, the leaf A-D route carried in the second BGP message may further include the sub-domain to which the first BFER belongs. Optionally, in a possible case, one BIER domain is configured with only one sub-domain. In this case, the BIFT-id may be determined based on only the two parameters the SI and the BSL. Therefore, the leaf A-D route fed back by the first BFER does not need to carry the sub-domain to which the BFER belongs.

With reference to the third aspect, in some optional embodiments, the leaf A-D route carried in the second BGP message may further include the BSL supported by the first BFER. Optionally, BSLs supported by entire multicast domains may be the same, that is, no additional notification is required, and the sender also knows the BSL. Therefore, the leaf A-D route fed back by the first BFER does not need to carry the BSL.

According to a fourth aspect, a router may include a plurality of function modules or units configured to correspondingly perform the multicast data transmission method provided in the first aspect or the multicast data transmission method provided in any one of the possible implementations of the first aspect.

According to a fifth aspect, a router may include a plurality of function modules or units configured to correspondingly perform the multicast data transmission method provided in the second aspect or the multicast data transmission method provided in any one of the possible implementations of the second aspect.

According to a sixth aspect, a router may include a plurality of function modules or units configured to correspondingly perform the multicast data transmission method provided in the third aspect or the multicast data transmission method provided in any one of the possible implementations of the third aspect.

According to a seventh aspect, a router is configured to perform the multicast data transmission method described in the first aspect. The router may include a memory, and a processor and a transceiver that are coupled to the memory. The transceiver is configured to communicate with another communications device. The memory is configured to store code for implementing the multicast data transmission method described in the first aspect. The processor is configured to execute program code stored in the memory, that is, perform the multicast data transmission method provided in the first aspect or the multicast data transmission method provided in any one of the possible implementations of the first aspect.

According to an eighth aspect, a router is configured to perform the multicast data transmission method described in the second aspect. The router may include a memory, and a processor and a transceiver that are coupled to the memory. The transceiver is configured to communicate with another communications device. The memory is configured to store code for implementing the multicast data transmission method described in the second aspect. The processor is configured to execute program code stored in the memory, that is, perform the multicast data transmission method provided in the second aspect or the multicast data transmission method provided in any one of the possible implementations of the second aspect.

According to a ninth aspect, a router is configured to perform the multicast data transmission method described in the third aspect. The router may include a memory, and a processor and a transceiver that are coupled to the memory. The transceiver is configured to communicate with another communications device. The memory is configured to store code for implementing the multicast data transmission method described in the third aspect. The processor is configured to execute program code stored in the memory, that is, perform the multicast data transmission method provided in the third aspect or the multicast data transmission method provided in any one of the possible implementations of the third aspect.

According to a tenth aspect, a communications system is provided, and the communications system may include a first router and a second router. The first router may be the router described in the fifth aspect, and the second router may be the router described in the sixth aspect. The communications system may further include a third router, and the third router may be the router described in the fourth aspect.

Optionally, the first router may be the router described in the eighth aspect, the second router may be the router described in the ninth aspect, and the third router may be the router described in the seventh aspect.

According to an eleventh aspect, a computer-readable storage medium is provided. The readable storage medium stores an instruction, and when the instruction is run on a computer, the computer is enabled to perform the multicast data transmission method described in the first aspect, the second aspect, or the third aspect.

According to a twelfth aspect, a computer program product including an instruction is provided. When the computer program product is run on a computer, the computer is enabled to perform the multicast data transmission method described in the second aspect or the third aspect.

BRIEF DESCRIPTION OF THE DRAWINGS

To describe the technical solutions in the embodiments or in the background more clearly, the following briefly describes the accompanying drawings for describing the embodiments or the background.

DETAILED DESCRIPTION

Terms used in implementations are merely used to explain specific embodiments, but are not intended to limit this disclosure.

Figure 1:
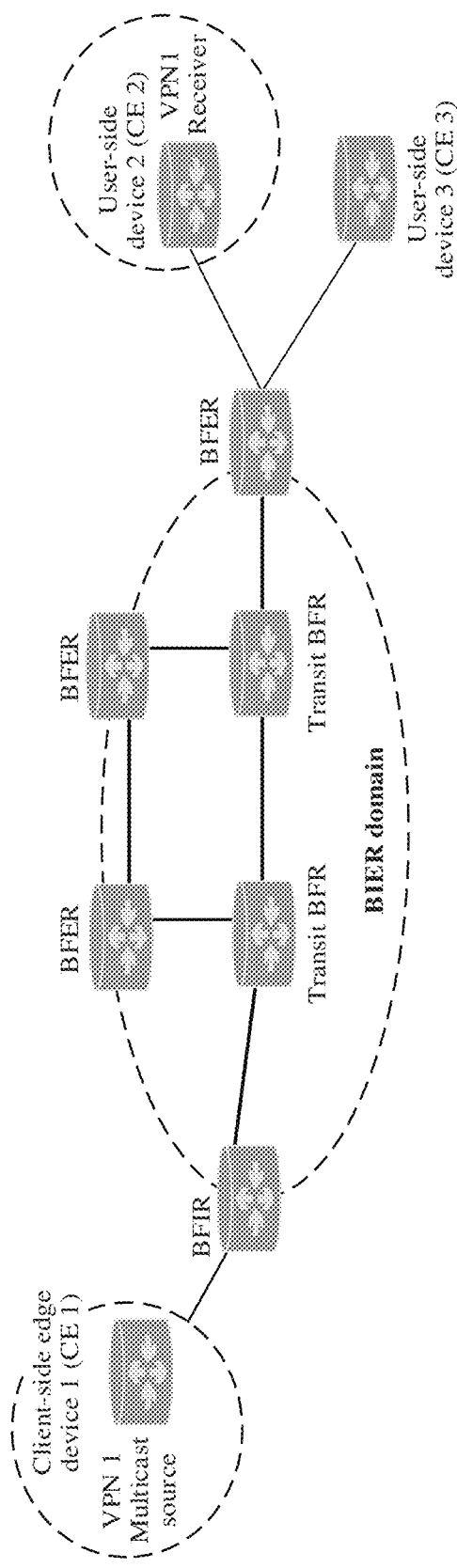
FIG. 1 is a schematic diagram of a BIER architecture.

FIG. 1 shows a BIER architecture. In the BIER architecture, a router supporting BIER is referred to as a bit-forwarding router (BFR). A BIER control plane protocol runs in a BIER domain and allows BFRs in the BIER domain to exchange information about forwarding a BIER data packet between the BFRs using a BIER forwarding mechanism.

As shown in FIG. 1, a BIER domain may include the following routers: a bit-forwarding ingress router (BFIR) 101, a bit-forwarding egress router BFER 105, and a transit BFR 103. Specifically, a multicast data packet enters the BIER domain at the bit-forwarding ingress router BFIR 101, and leaves the BIER domain at the bit-forwarding egress router BFER 105. The transit BFR is used to receive a multicast data packet from another BFR in the same BIER domain, and forward the multicast data packet to another BFR in the same BIER domain. For some multicast traffic, a single BFR may be a BFIR. For some other multicast traffic, the single BFR may be a BFER. For still some other multicast traffic, the single BFR may be a transit BFR. In fact, for a given data packet, a BFR may be one of a BFIR and/or a transit BFR and/or a BFER corresponding to the BFR.

A BIER domain may contain one or more sub-domains. A sub-domain identifier (represented as sub-domain-id) is configured for each sub-domain, and the sub-domain-id is in a range [0, 255]. For a sub-domain to which a specific BFR belongs, if the BFR can serve as a BFIR/BFER, the BFR is provisioned with one BFR-id, and the BFR-id is unique in the sub-domain. For example, if a BIER sub-domain contains 1,374 BFRs, each BFR may be provisioned with one BFR-id (ranging from 1 to 1374). If a specific BFR belongs to a plurality of sub-domains, the BFR may have different BFR-ids in the plurality of sub-domains (although not necessarily). In addition, each BFR is provisioned with a "BFR-prefix" in a sub-domain to which the BFR belongs. A BFR-prefix of a BFR is an Internet Protocol version 4 (IPv4) or Internet Protocol version 6 (IPv6) address of the BFR. A BFR-prefix of a given BFR is routable in a sub-domain to which the BFR belongs.

Figure 2:
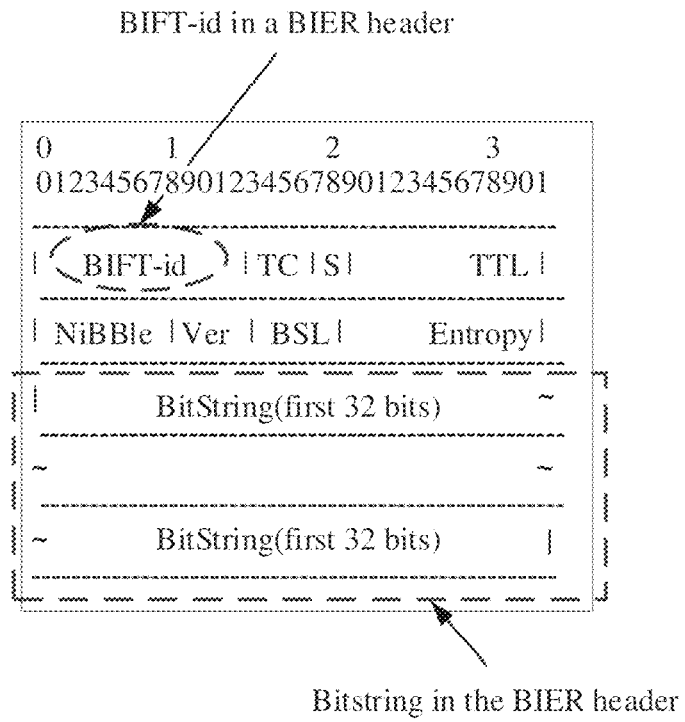
FIG. 2 is a schematic diagram of a data structure of a BIER header.

When a multicast data packet enters, from outside, a BIER domain at a BFIR, the BFIR determines a set of BFERs to which the multicast data packet is to be sent and a sub-domain in which the data packet is to be transmitted. Once the BFIR determines the BFER set and the sub-domain for the multicast data packet, the BFIR performs BIER encapsulation on the multicast data packet by using a BIER header. In other words, the multicast data packet can be forwarded in the BIER domain only after being encapsulated into a BIER data packet. As shown in FIG. 2, a form of the BIER header used for the BIER encapsulation may include: a BIFT-id and a bitstring. The BIFT-id is a BIFT-id, and is used to indicate a specific BIFT for which a BFR is to search to forward the BIER data packet. The bitstring represents a receiver of multicast data in the BIER domain, and each bit in the bitstring represents one BFR-id. To indicate a specific BFER that is to join a multicast group, the BFIR may set a bit corresponding to a BFR-id of the specific BFER in the bitstring. For example, a bitstring "0110" represents that receivers in the multicast group are a BFER whose BFR-id is 2, and a BFER whose BFR-id is 3.

The following describes key technologies involved in a multicast forwarding mechanism in a BIER domain: BIFT and bitstring.

(1) BIFT

1. Advertising a BFR-Id and a BFR-Prefix

In a BIER domain, each BFER advertises a BFR-id of the BFER to all the other BFRs. For example, the BFR-id may be advertised by using an opaque link-state advertisement (LSA) message, where an extension field for carrying BIER information (such as a sub-domain and a BFR-id) is added in the message. The opaque LSA is an option for running the Interior BGP (iBGP) protocol. Similarly, each BFR advertises a BFR-prefix of the BFR to all the other BFRs.

2. A BFR First Generates a Bit Index Routing Table (BIRT)

The BIRT is a table that maps from a BFR-id of a BFER to a BFR-prefix of the BFER, and to a BFR neighbor (BFR-NBR) on a path to the BFER.

Figure 3:
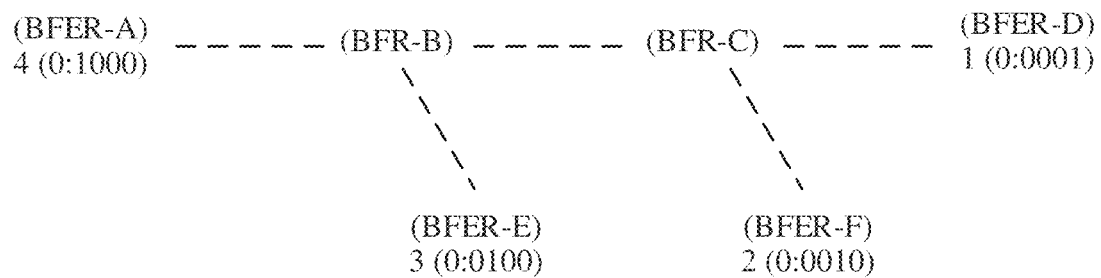
FIG. 3 is an example schematic diagram of a topology structure in a BIER domain.

A BIER topology shown in FIG. 3 is used as an example. In FIG. 3, a BFR-id of each BFR may be represented in a form of SI:bitstring. The SI represents a subset identifier (Set Identifier) to which the BFR-id belongs. Both the SI and the bitstring are obtained by converting the BFR-id, and the conversion is determined based on a parameter "bitstring length (BSL)". For example, it is assumed that a BSL is 4. If the BFR-id is 1, when the SI is 0, the bitstring is "0001". If the BFR-id is 2, when the SI is 0, the bitstring is "0010". Herein, if the SI is not greater than the BSL, the SI is equal to 0. The examples are merely for explanation and should not be construed as a limitation.

In the topology shown in FIG. 3, a BIRT shown in Table 1 is generated at the BFR-B. The first column represents BFR-ids of BFERs (BFER-A, BFER-E, BFER-F, and BFER-D) at which the BFR-B can arrive. The second column represents BFR-prefixes of the BFERs at which the BFR-B can arrive. The third column represents BFR-NBRs (that is a next hop) on paths through which the BFR-B arrives at the BFERs.

TABLE 1

| BFR-id of a BFER (SI:BitString) | BFR-prefix of the BFER | BFR-NBR |
| --- | --- | --- |
| 4 (0:1000) | A | A |
| 1 (0:0001) | D | C |
| 3 (0:0100) | E | E |
| 2 (0:0010) | F | C |

3. A BFR Generates a BIFT Based on a BIRT

Assuming that several rows in the BIRT have a same SI and a same BFR-NBR, a bit mask in the BIFT, that is, F-BM, may be obtained by performing a logical OR operation on bitstrings corresponding to BFR-ids in the several rows.

For example, Table 2 shows a BIFT of the BFR-B generated based on Table 1. The BIFT is used to map from the BFR-id of the BFER to a corresponding F-BM and BFR-NBR. The F-BM represents BFERs that are reachable from each BFR-NBR of the BFR-B. It can be seen that a bit mask (F-BM) "0011" may be obtained by performing a logical OR operation on bitstrings in two rows having a same SI (0) and a same BFR-NBR (the BFR-C) in the BIRT shown in Table 1.

TABLE 2

| BFR-id of a BFER (SI:BitString) | F-BM | BFR-NBR |
| --- | --- | --- |
| 1 (0:0001) | 0011 | C |
| 2 (0:0010) | 0011 | C |
| 3 (0:0100) | 0100 | E |
| 4 (0:1000) | 1000 | A |

Once all BFIRs and transit BFRs in the BIER domain generate respective BIFTs, the BFIRs and the transit BFRs in the BIER domain can perform multicast forwarding based on BIER headers of received BIER data packets.

(2) Bitstring

A BFIR needs to know which BFERs are interested in a specific multicast group. In this way, the BFIR can determine BFERs to which multicast data corresponding to the multicast group is to be sent. The BFER interested in the specific multicast group is determined by the BFIR as a receiver of the specific multicast group. The receiver of the specific multicast group is a receiver of the multicast data corresponding to the specific multicast group.

Figure 4:
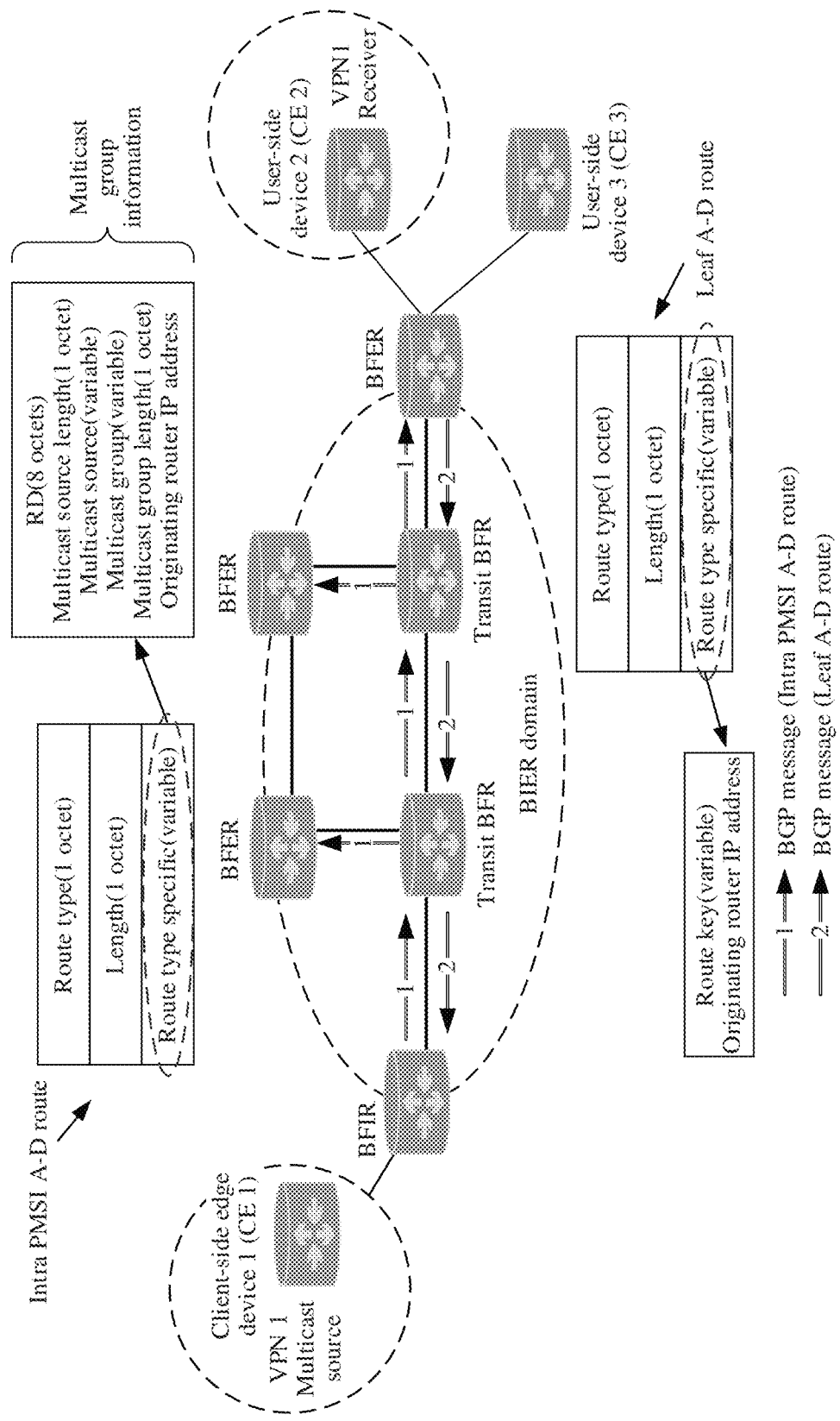
FIG. 4 is a schematic diagram of multicast information advertisement and feedback in a BIER domain.

In an MVPN, both a BFIR and a BFER are provider edge (PE) devices, and the BFIR and the BFER exchange multicast information (for example, a multicast group address) by using a BGP message. FIG. 4 shows a process of multicast information advertisement and feedback in a BIER domain. As shown in FIG. 4, in a BIER domain, a BFIR sends a BGP message carrying a P-multicast service interface auto-discovery route (PMSI A-D route), to notify BFERs of multicast information. Correspondingly, a BFER interested in a multicast group represented by the multicast information gives a feedback by using a BGP message carrying a leaf auto-discovery route (Leaf A-D route).

Figure 5:
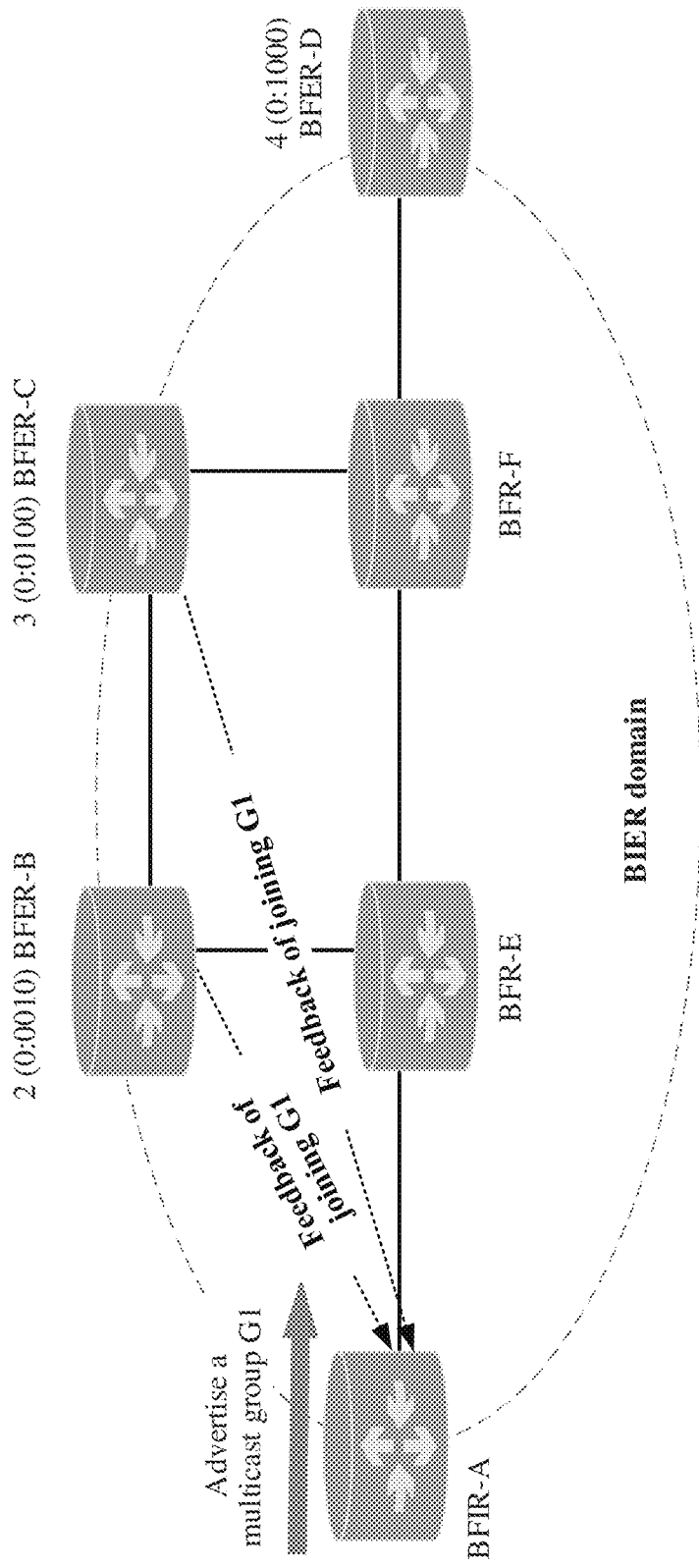
FIG. 5 is a schematic diagram in which a BFER in a BIER domain gives a feedback of joining a multicast group.

For example, as shown in FIG. 5, after the BFIR knows receivers (BFERs) of a multicast group, the BFIR may generate a multicast receiver table shown in Table 3. In the multicast group receiver table shown in Table 3, Receiver represents a prefix of a receiver of a multicast group G1, Group ID is a multicast group identifier, and Joined represents whether a BFER joins the multicast group G1.

TABLE 3

| Receiver | Group ID | Joined |
| --- | --- | --- |
| B | G1 | Yes |
| C | G1 | Yes |
| D | G1 | No |

Then, the BFIR may determine a bitstring based on BFR-ids of the receivers of the multicast group. For example, as shown in Table 2, the receivers of the multicast group G1 are: the BFER-B (whose BFR-id is 2) and the BFER-C (whose BFR-id is 3). The BFIR may convert the BFR-id of the BFER-B into "0010", convert the BFR-id of the BFER-C into "0100", and then perform a logical OR operation on "0010" and "0100" to obtain a bitstring "0110".

For a part of the BIER technology that is not mentioned in the foregoing content, refer to IETF BIER_ARCH. Details are not described herein.

Figure 6:
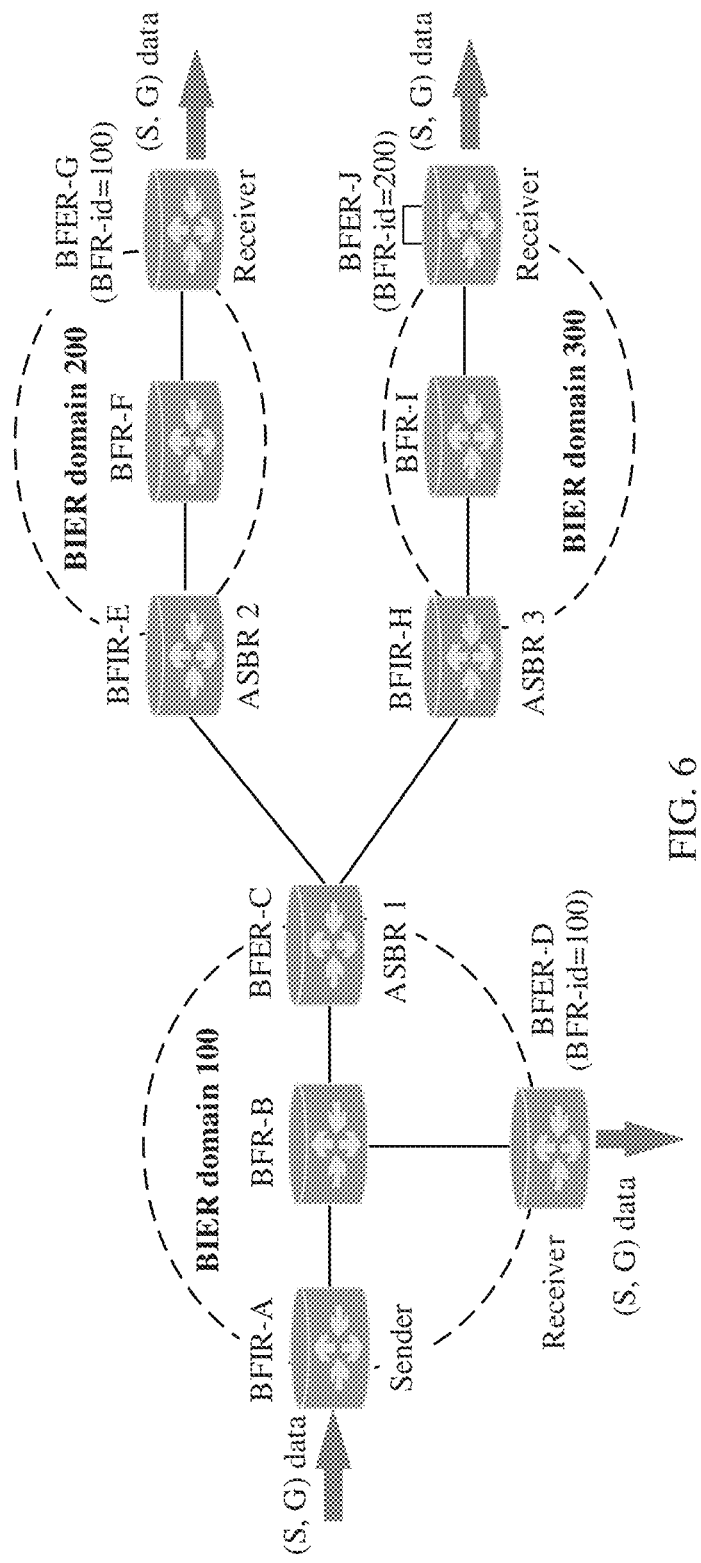
FIG. 6 is a schematic diagram of an application scenario of a BIER-MVPN.

To become a widely used next-generation multicast protocol, the BIER technology needs to fully support an MVPN. FIG. 6 shows an example of a BIER-MVPN application scenario. A multicast domain may include a plurality of BIER domains (for example, a BIER domain 100, a BIER domain 200, and a BIER domain 300). Multicast data needs to be sent from a sender (a BFIR on a multicast source side), undergoes many times of BIER intra-domain forwarding and BIER inter-domain forwarding, and finally arrives at each receiver (user-side BFER). From a perspective of the entire multicast domain, a BIER domain is equivalent to an autonomous system (AS). A BFIR and a BFER between BIER domains are also called autonomous system border routers (ASBRs).

Figure 7A:
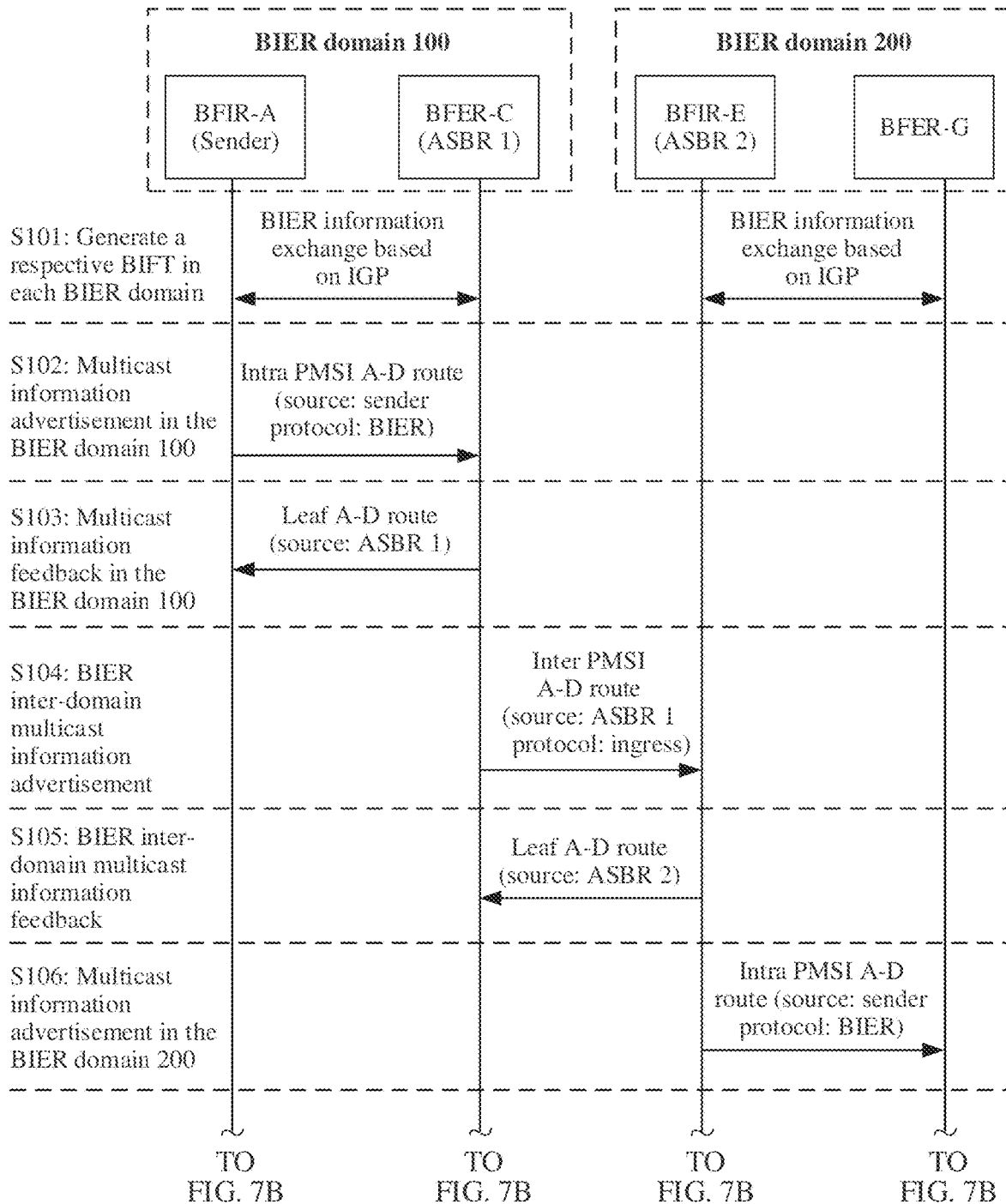
FIG. 7A and FIG. 7B are a schematic flowchart of an existing BIER-MVPN solution.
Figure 7B:
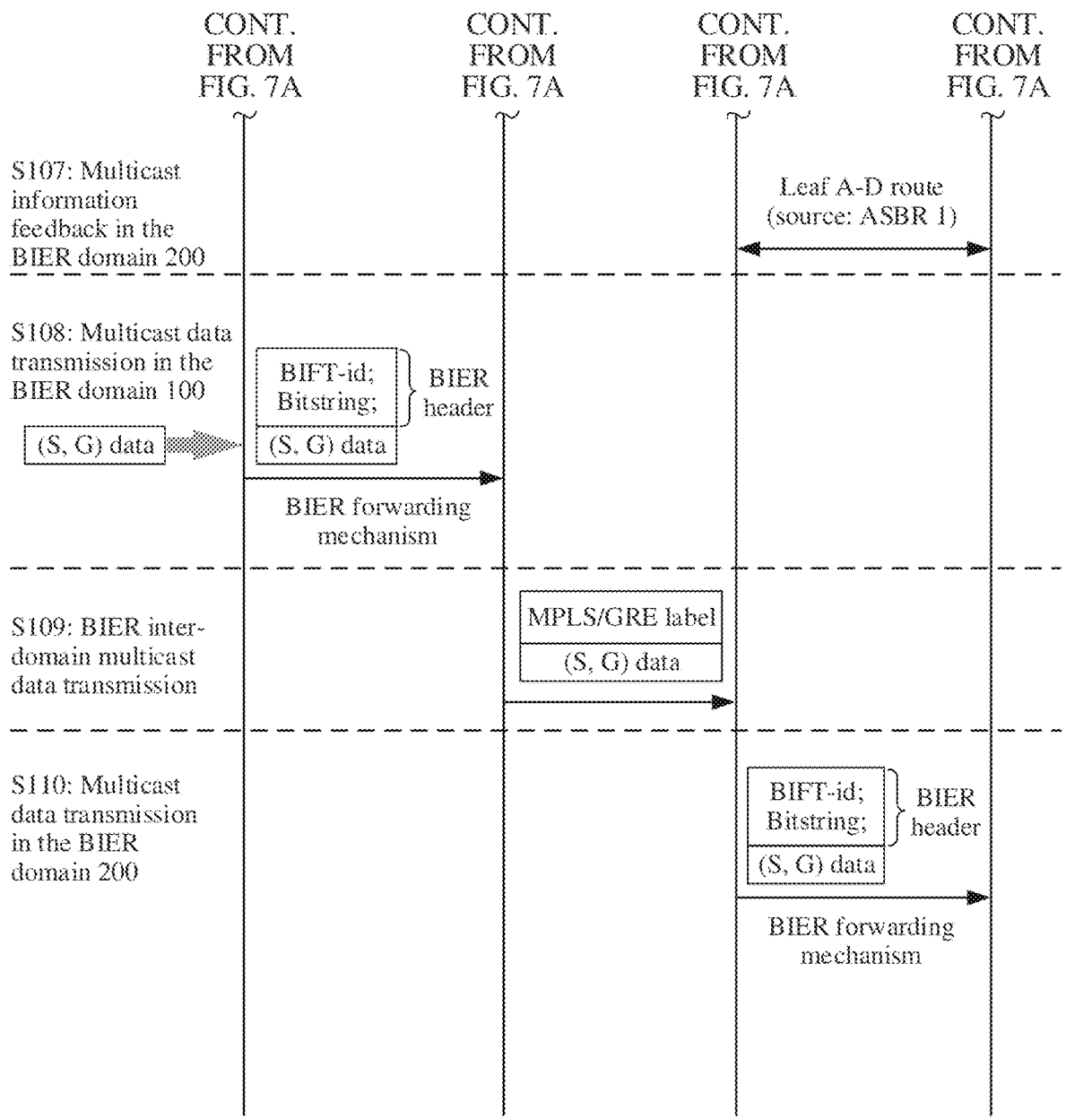

Using the BIER-MVPN application scenario shown in FIG. 6 as an example, FIG. 7A and FIG. 7B show an existing MVPN draft in which the BIER technology is used "existing BIER-MVPN solution) as described in E. Rosen, et al., "Multicast VPN Using BIER," Mar. 19, 2018, which provides a method for forwarding multicast data in the entire multicast domain. Details are as follows.

(1) Phase 1 (S101): A BFIR and a BFR in the BIER Domain Generate Respective BIFTs.

It can be learned from the key technical point "BIFT" described in the foregoing content that, in the BIER domain, the BFIR and the BFR each can generate a BIFT arriving at each BFER. A BFER in the BIER domain further advertises a BIFT-id of a BIFT, to implicitly indicate a sub-domain to which the BFER belongs, an SI to which the BFR-id of the BFER belongs, and a BSL supported by the BFER. In other words, the BIFT-id based on which multicast data is forwarded to the BFER is determined based on three parameters: the sub-domain to which the BFER belongs, the SI to which the BFR-id of the BFER belongs, and the BSL supported by the BFER.

In addition, the BFIR may further generate a table including a correspondence between a BFR-prefix and a BFR-id for a BFER in the BIER domain in which the BFIR is located.

The BFIR and the BFR in the BIER domain generate the respective BIFTs. Therefore, after receiving a BIER data packet, the BFIR and BFR can forward the BIER data packet in multicast mode based on a BIFT-id and a bitstring in a BIER header. The BIFT-id is used to indicate a BIFT for which the BIER router searches to forward the multicast data. The bitstring represents BFR-ids of all receivers (BFERs) of the multicast data.

(2) Phase 2 (S102-S107): Multicast Information Advertisement and Feedback

Figure 8:
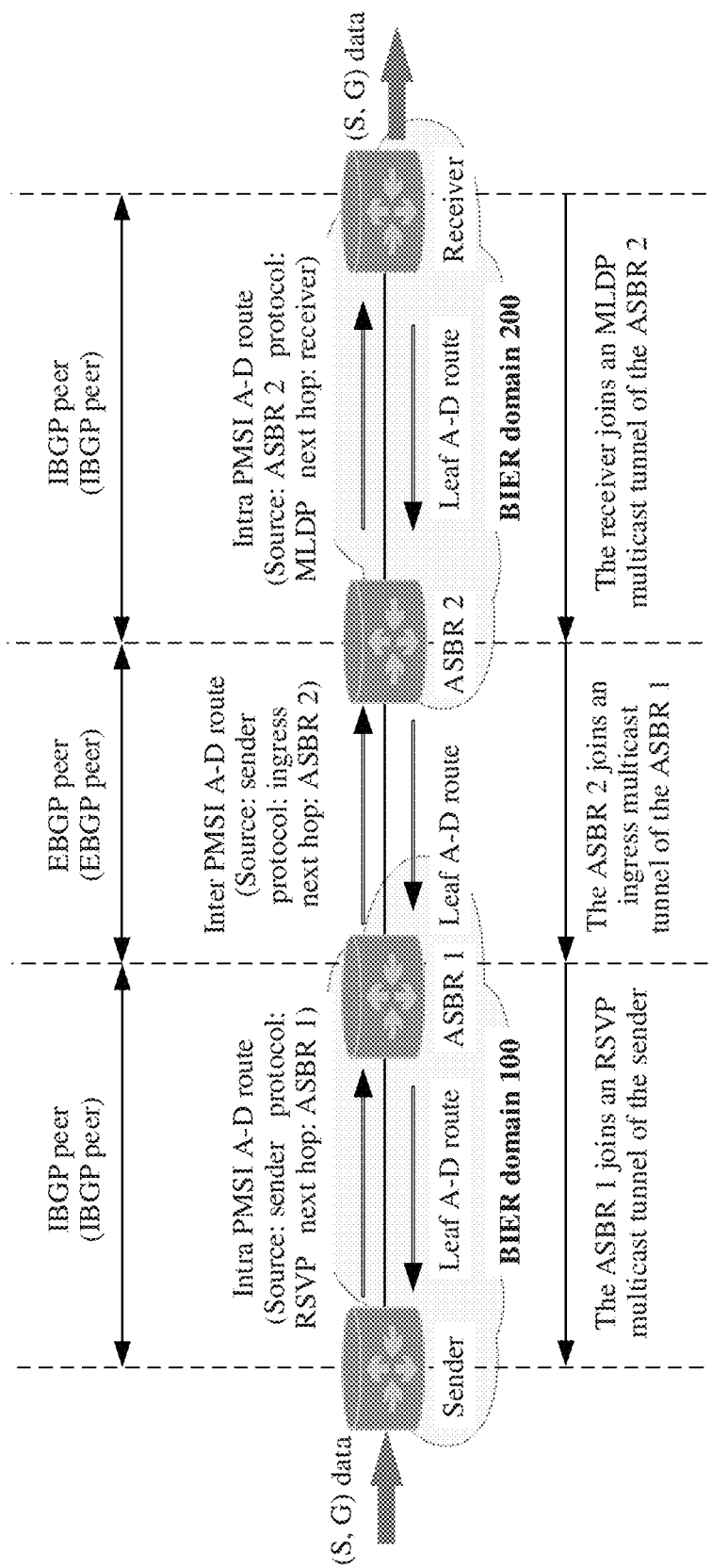
FIG. 8 is a schematic diagram of an existing process of multicast information advertisement and feedback.

The multicast information advertisement is used by a BFIR in a BIER domain to know which BFERs in the BIER domain are interested in a multicast group, and includes BIER intra-domain multicast information advertisement and feedback and BIER inter-domain multicast information advertisement and feedback. FIG. 8 shows a process of multicast information advertisement and feedback. Both the Resource Reservation Protocol (RSVP) and the Multicast Label Distribution Protocol (MLDP) in FIG. 8 can be used to implement label distribution. The ingress replication (IR) (also referred to as head-end replication) protocol can be used to implement point-to-multipoint data forwarding, for example, flood forwarding. Details are as follows.

S102: Perform multicast information advertisement in the BIER domain 100.

As shown in FIG. 8, the sender sends an intra PMSI A-D route by using an intra-domain BGP message to a BFER in the BIER domain 100, to advertise multicast information. If the BFER in the BIER domain 100 is interested in a multicast group represented by the multicast information, the BFER needs to feed back a leaf A-D route to notify the sender, to join a multicast tunnel of the sender.

Figure 9:
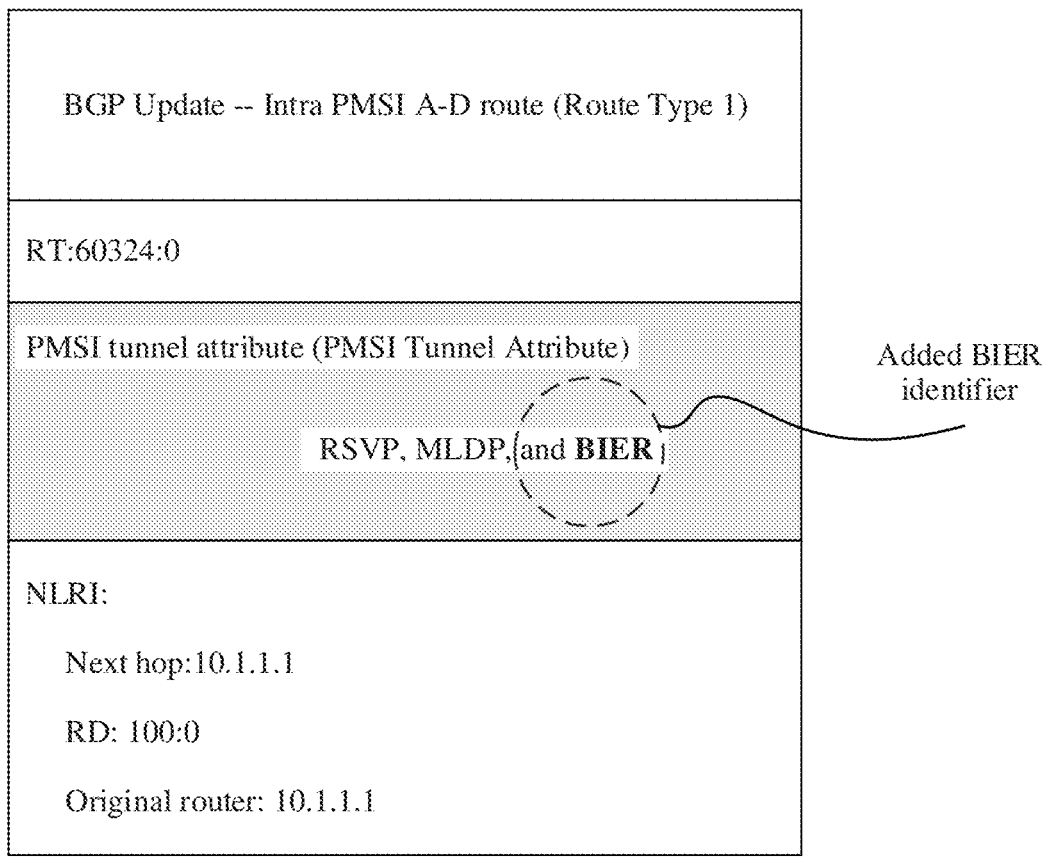
FIG. 9 is a schematic diagram of a data structure of an extended intra PMSI A-D route.

In the existing BIER-MVPN solution, as shown in FIG. 9, the sender needs to add a BIER identifier to a PMSI tunnel attribute of the intra PMSI A-D route, to indicate that the BGP message carrying the intra PMSI A-D route is a BIER multicast message.

S103: Perform multicast feedback in the BIER domain 100.

As shown in FIG. 8, after the intra-domain BGP message carrying the intra PMSI A-D route sent by the sender is received, if the BFER in the BIER domain 100 is interested in the multicast group represented by the multicast information, the BFER feeds back the leaf A-D route to the sender by using the intra-domain BGP message, where the leaf A-D route carries a BFR-prefix of the BFER. Specially, after an ASBR 1 in the BIER domain 100 receives the intra PMSI A-D route sent by the sender, to flood the multicast information to another BIER domain, the ASBR 1 needs to feed back a leaf A-D route to the sender by using a BGP message. Herein, the BFER interested in the multicast group is a receiver of the multicast group.

In this way, the sender can find a BFR-id of the receiver based on the BFR-prefix of the receiver, and then determine bitstrings corresponding to the multicast group in the BIER domain 100 based on BFR-ids of receivers. In addition, in S101, the sender can know BIFT-ids required for sending the multicast data to BFERs with different BFR-ids. The bitstring and the BFIT-id are two most important elements in a BIER header, and are used to indicate how a BFR receiving a BIER data packet in the BIER domain 100 forwards multicast group data.

S104: Perform BIER inter-domain multicast information advertisement.

As shown in FIG. 8, after the ASBR 1 in the BIER domain 100 receives the intra PMSI A-D route sent by the sender, the ASBR 1 parses the intra PMSI A-D route, records the multicast group and MVPN information, and generates an inter-domain BGP message that uses the BFER as a source. Then, the ASBR 1 sends, in a flood manner, the inter PMSI A-D route by using the inter-domain BGP message to all External BGP (eBGP) peers of the ASBR 1, such as an ASBR 2.

S105: Perform BIER inter-domain multicast information feedback.

As shown in FIG. 8, after the ASBR 2 receives the inter PMSI A-D route sent by the ASBR 1, to flood the multicast information to a BFR in another BIER domain, the ASBR 2 needs to feed back a leaf A-D route to the ASBR 1, where the leaf A-D route carries a BFR-prefix of the ASBR 2. In this way, the ASBR 1 can generate a table including a correspondence between the multicast group and the BFR-prefix of the receiver, so that the ASBR 1 can know an ASBR to which multicast data is to be sent when the multicast data arrives. It should be noted that BIER inter-domain forwarding is different from BIER intra-domain forwarding, and during inter-domain multicast data forwarding, BIER encapsulation is not performed, but a label is added. Details are described in the following content.

S106: Perform multicast advertisement in the BIER domain 200.

As shown in FIG. 8, the ASBR 2 sends the intra PMSI A-D route to a BFER in the BIER domain 200 by using the intra-domain BGP message, to advertise the multicast information from the sender. A multicast information advertisement mechanism in the BIER domain 200 is the same as a multicast information advertisement mechanism in the BIER domain 100. For details, refer to S102.

S107: Perform multicast feedback in the BIER domain 200.

As shown in FIG. 8, after the intra-domain BGP message carrying the intra PMSI A-D route sent by the ASBR 2 is received, if a BFER in the BIER domain 200 is interested in the multicast group represented by the multicast information, the BFER feeds back the leaf A-D route to the sender by using the intra-domain BGP message, where the leaf A-D route carries a BFR-prefix of the BFER. Herein, the BFER interested in the multicast group is a receiver of the multicast group.

In this way, the ASBR 2 can find a BFR-id of the receiver based on the BFR-prefix of the receiver, and then determine bitstrings corresponding to the multicast group in the BIER domain 200 based on BFR-ids of receivers. In addition, in S101, the ASBR 2 can know BIFT-ids required for sending the multicast data to BFERs with different BFR-ids. The bitstring and the BFIT-id are two most important elements in a BIER header, and are used to indicate how a BFR receiving a BIER data packet in the BIER domain 200 forwards the multicast data.

Based on S102 to S107, the multicast information advertisement and feedback are summarized as follows.

1. BIER Intra-Domain Multicast Information Advertisement and Feedback (S102-S103 and S106-S107)
    a. The BFIR sends the intra PMSI A-D route (with an added BIER identifier) to the BFER by using the intra-domain BGP message, to advertise the multicast information.
    b. The BFER being interested in the multicast group feeds back, to the BFIR, the leaf A-D route (carrying the prefix of the BFER) by using the intra-domain BGP message. In this way, the BFIR can find the BFR-id of the BFER based on the BFR-prefix of the BFER, and then know which BFERs in the domain are interested in the multicast group (that is, the receivers), and determine the bitstring corresponding to the multicast group in the domain. In addition, in step 1, the BFIR can further find the BIFT-ids required for sending the multicast group to the receivers. The BIFT-id and the bitstring are two most important elements in the BIER header, and are used to indicate how the BFR receiving the BIER data packet forwards the multicast group in the domain. It can be seen that effect of the bitstring is limited to the BIER domain, and the bitstring can only indicate receivers of a multicast group in a specific BIER domain.

2. BIER Inter-Domain Multicast Information Advertisement and Feedback (S104-S105)
    a. A BFER in a BIER domain (such as the ASBR 1 in the BIER domain 100) sends an inter PMSI A-D route (with the added BIER identifier) to a BFIR in another adjacent BIER domain (such as the ASBR 2 in the BIER domain 200) by using an inter-domain BGP message, to perform multicast advertisement.
    b. The BFIR of the another BIER domain feeds back a leaf A-D route (carrying a BFR-prefix of the BFIR) to the BFER of the BIER domain by using an inter-domain BGP message. In this way, the BFER can generate a table including a correspondence between the multicast group and the BFR-prefix of the BFIR, and know a BFIR to which multicast data corresponding to a specific multicast group is to be sent when the multicast data arrives.

It can be seen that, in the existing BIER-MVPN solution, the multicast information is advertised and fed back in a segmented manner. For same multicast information, different BIER domains need to respectively generate BGP messages, to finally advertise the multicast information to the BFER of each domain. In this way, convergence time of the multicast information advertisement and feedback is very long, and effectiveness is poor.

Figure 10:
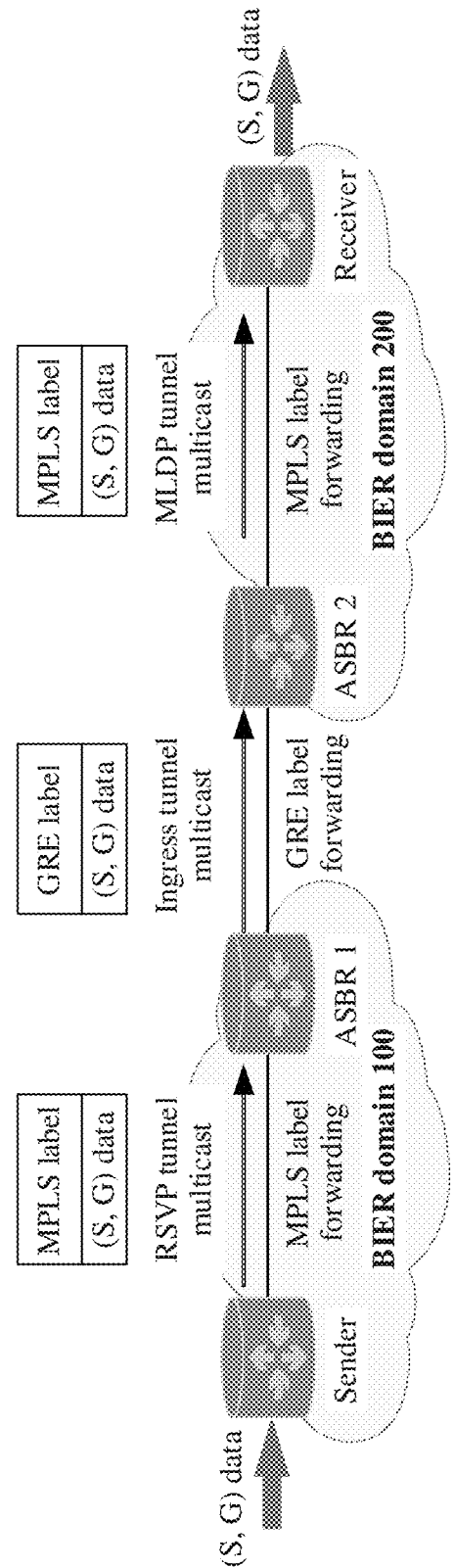
FIG. 10 is a schematic diagram of a multicast data transmission mode in an existing MVPN framework.

(3) Multicast Data Forwarding (Step 8 to Step 10): Intra-Domain Forwarding and Inter-Domain Forwarding Before introducing a multicast data forwarding manner in the existing BIER-MVPN solution, a segment-based inter-domain multicast transmission manner in an MVPN framework is first introduced. For example, as shown in FIG. 10, when the sender needs to send multicast data, the sender may encapsulate a multi-protocol label switching (MPLS) header corresponding to an intra-domain tunnel for the multicast data, and perform, in the AS 100, MPLS label forwarding for the multicast data encapsulated with the MPLS header, to send the data to a PE and the ASBR 1 in the AS 100. Then, the ASBR 1 may parse the received multicast data encapsulated with the MPLS header, re-encapsulate a generic routing encapsulation (GRE) header corresponding to a corresponding inter-domain tunnel for the multicast data, and perform GRE label forwarding on the multicast data encapsulated with the GRE header between domains, to send the data to the ASBR 2 in the AS 200. Then, the ASBR 2 may parse the received multicast data encapsulated with the GRE header, re-encapsulate an MPLS header corresponding to a corresponding intra-domain tunnel for the multicast data, and perform, in the AS 200, MPLS label forwarding on the multicast data encapsulated with the MPLS header, to send the data to a receiver PE. Finally, the receiver PE removes the MPLS header and forwards the multicast data to a user-side device.

Different from the segment-based inter-domain multicast transmission manner in the MVPN framework, in the existing BIER-MVPN solution, a BIER forwarding mechanism is used in the BIER domain to forward multicast data. Details are as follows.

S108: Perform multicast data forwarding in the BIER domain 100.

Specifically, when multicast data arrives, the sender searches for a bitstring that corresponds to the multicast data in the BIER domain 100, where the bitstring is determined in S103. In addition, the sender further needs to determine a BIFT-id required for forwarding the multicast data to a receiver in the BIER domain 100, where the BIFT-id is already determined in S101. Then, the sender generates a BIER header by using the bitstring and the BIFT-id, and performs BIER encapsulation on the multicast data to obtain a BIER data packet. In this way, the sender and a transit BFR in the BIER domain 100 can forward the multicast data to the receiver (for example, the ASBR 1) in the BIER domain 100 based on the BIER header and the BIER forwarding mechanism.

S109: Perform BIER inter-domain multicast data forwarding.

Specifically, when receiving the BIER data packet, the ASBR 1 first searches for a BFR-prefix (that is, the BFR-prefix of the ASBR 2) that corresponds to the multicast data in the BIER data packet, where the BFR-prefix is determined in step S105 and is used to indicate to send the multicast data to the ASBR 2. Then, the ASBR 1 encapsulates the multicast data with a GRE or MPLS header, and sends the multicast data to the ASBR 2.

S110: Perform multicast data forwarding in the BIER domain 200.

Specifically, the ASBR 2 parses the received multicast data encapsulated with the GRE or MPLS header. Then, the ASBR 2 searches for a bitstring that corresponds to the multicast data in the BIER domain 200, where the bitstring is determined in S103. In addition, the ASBR 2 further needs to determine a BIFT-id required for forwarding the multicast data to a receiver in the BIER domain 200, where the BIFT-id is already determined in S101. Then, the ASBR 2 generates a BIER header by using the bitstring and the BIFT-id, and performs BIER encapsulation on the multicast data to obtain a BIER data packet. In this way, the ASBR 2 and a transit BFR in the BIER domain 200 can forward the multicast data to the receiver in the BIER domain 200 based on the BIER header and the BIER forwarding mechanism.

Finally, the receiver in the BIER domain 200 removes the BIER header of the BIER data packet, reads the multicast data, and forwards the multicast data to a user side device.

Based on S108 to S110, the multicast data forwarding is summarized as follows.

1. Multicast Data Forwarding in the BIER Domain (S108 and S110)
   a. When multicast data arrives, a BFIR in a BIER domain first finds a bitstring that corresponds to the multicast data in the BIER domain and a BIFT-id required for forwarding the multicast data to a receiver in the BIER domain, generates a BIER header for the multicast data, and performs BIER encapsulation on the multicast data by using the BIER header to obtain a BIER data packet.
   b. The BFIR and a transit BFR in the BIER domain forward the multicast data to the receiver in the BIER domain based on the BIER header and the BIER forwarding mechanism (An operation such as logical AND is performed on the bitstring and an F-BM in a BIFT, and for details, refer to IETF BIER_ARCH).

2. BIER Inter-Domain Multicast Data Forwarding (S109)
   a. When receiving a BIER data packet, a BFER in a domain (for example, the ASBR 1 in the BIER domain AS 100) first decapsulates the BIER data packet and reads multicast data, then, searches for a BFR-prefix (for example, the BFR-prefix of the ASBR 2 in the BIER domain 200) corresponding to the multicast data, and finally adds an MPLS label or a GRE label to the multicast data by using the BFR-prefix.
   b. The BFER sends the labeled multicast data to a BFIR in another domain that is represented by the BFR-prefix. In this way, after receiving the labeled multicast data, the BFIR in the another domain also searches for a bitstring that corresponds to the multicast data in the another domain and a BIFT-id required for forwarding the multicast data to a receiver in the another domain, and generates a BIER header for the multicast data. Finally, a BFR in the another domain performs multicast forwarding based on the BIER forwarding mechanism.

In the existing BIER-MVPN solution, the multicast data is forwarded by segment. When the multicast data is transmitted from the sender PE to the receiver PE in the another BIER domain, a plurality of devices (such as the BFIR and the BFER in each BIER domain) need to participate in generation of the BIER header. In this way, efficiency is low and timeliness is poor.

For a disadvantage existing in the existing BIER-MVPN solution, this disclosure provides a multicast data transmission method.

A main principle may be embodied in the following two phases: 1. multicast information advertisement and feedback; and 2. multicast data forwarding.

(A) A main principle of Phase 1 may include: Edge BFRs (a BFIR and a BFER) in different BIER domains establish a BGP peer, and directly exchange a BGP message through a BGP connection, to implement fast advertisement and fast feedback of multicast information.

(B) A main principle of Phase 2 may include: The entire multicast domain (a plurality of BIER domains) determines BIFT-ids together. To be specific, same as the sub-domain, SI, and BSL used to determine a BIFT-id in another BIER domain, a sender also determines, based on these parameters, a BIFT-id that corresponds to multicast data in the another BIER domain. A BIER header is constructed only at the sender, and no intermediate device needs to participate in construction of the BIER header. For a BIER data packet sent across domains, the sender uses a BFIR-prefix of a BFIR in another BIER domain for label encapsulation, and then unicasts the BIER data packet to a BFIR in the another domain. Different from an existing BIER-MVPN solution, multicast data forwarding in this disclosure is not segmental. An intermediate device (for example, a BFIR and a BFER of each BIER domain along a path) is not required to participate in generation of the BIER header any more. In this way, multicast forwarding is more efficient.

In Phase 1, to enable the edge BFRs in the different BIER domains to exchange the BGP message across domains, the following conditions need to be provided: 1. a TCP connection established based on bottom-layer label mapping; 2. a manually configured BGP peer; and 3. a BGP connection established by using a BGP open message. It can be understood that, once the BGP connection is established between the edge BFRs in the different BIER domains, the BGP message can be directly exchanged to implement multicast information advertisement and feedback across domains, without a need of segmental multicast information advertisement and feedback in the existing BIER-MVPN solution.

Herein, for a manner of manually configuring the BGP peer, a configuration command provided by a related operator may be used. For specific implementation of establishing the BGP connection by using the BGP open message, refer to RFC 1105.

Figure 11:
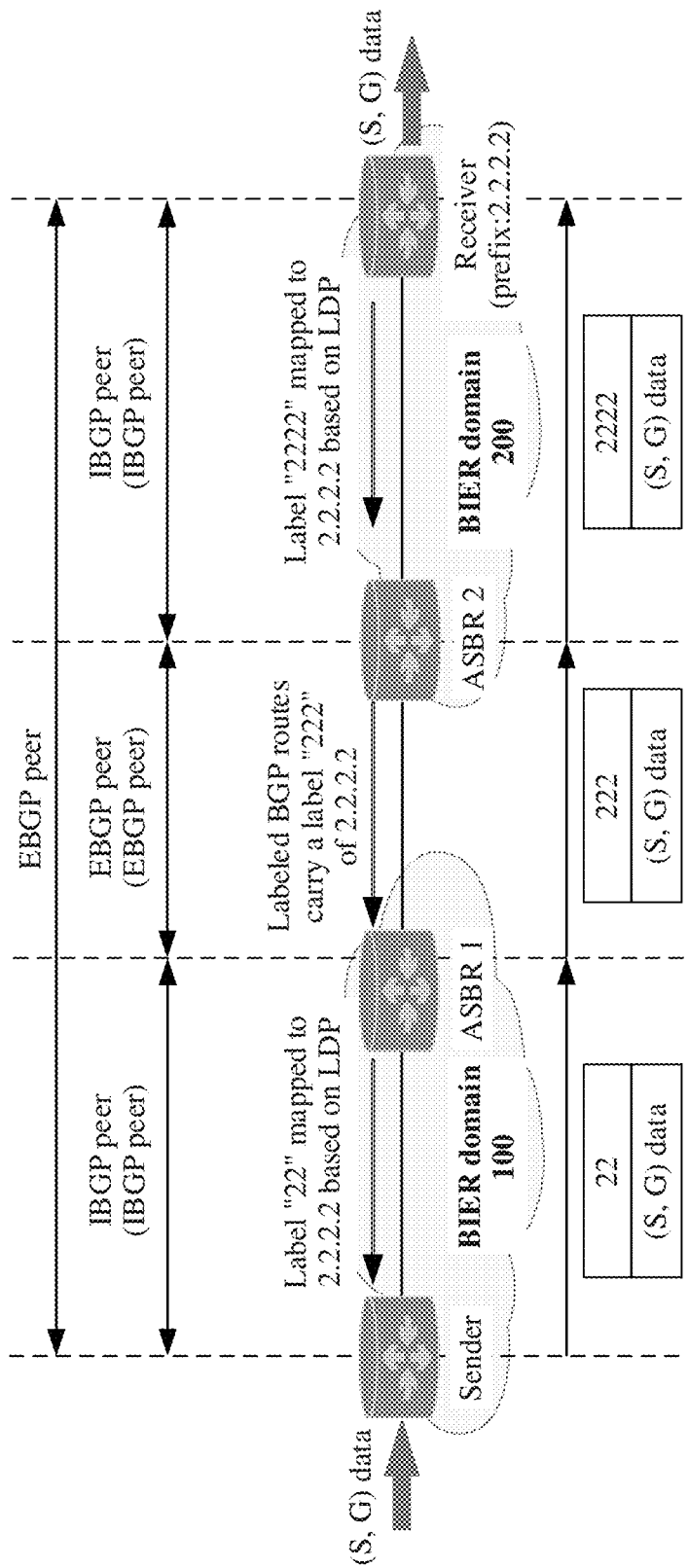
FIG. 11 is a schematic diagram of establishing a TCP connection through bottom-layer label mapping.

The following uses an example to describe how to establish the TCP connection based on the bottom-layer label mapping. For example, as shown in FIG. 11, the TCP connection between the edge BFRs in the different BIER domains may be established based on the following process:

1. A BFER in the BIER domain 200 maps a BFR-prefix "2.2.2.2" of the BFER to the ASBR 2 in the BIER domain 200 through a Label Distribution Protocol (LDP). A label corresponding to the BFR-prefix "2.2.2.2" can be used to encapsulate data to be sent to the BFER. In this way, the ASBR 2 can know which label needs to be used to encapsulate data forwarded to "2.2.2.2".

2. The ASBR 1 in the BIER domain 100 and the ASBR 2 in the BIER domain 200 transfer BFR-prefixes of the ASBR 1 and the ASBR 2 to each other based on the EBGP, and indicate each other to set corresponding labels. For example, the ASBR 1 needs to add a label "222" to the data to be sent to 2.2.2.2 (that is, the BFER in the BIER domain 200), and then sends the data to the ASBR 2.

3. The ASBR 1 directly notifies border BFRs (including the sender) in the BIER domain 100 of the BFR-prefix "2.2.2.2" through the iBGP. In this way, the sender can know that to send the data to 2.2.2.2, the sender only needs to forward the data to the ASBR 1. The ASBR 1 and the sender belong to the same BIER domain (that is, a same AS), and label forwarding mapping is established between the ASBR 1 and the sender. Therefore, the sender only needs to add a label "22" (reachable to the ASBR 1) to the data with a target of 2.2.2.2. Correspondingly, after receiving the data with the target of 2.2.2.2 and the label "22", the ASBR 1 replaces the label "22" with a label "222", and sends the data with the label "222" to the ASBR 2. The ASBR 2 then replaces the label "222" with a label "2222", and finally sends the data with the label "2222" to 2.2.2.2, that is, the BFER in the BIER domain 200.

Through the bottom-layer label mapping, a label corresponding to a BFR-prefix of an edge BFR in the BIER domain 200 is mapped to an edge BFR (such as the sender) in the BIER domain 100, and a TCP connection may be established between the sender in the BIER domain 100 and the edge BFR in the BIER domain 200. In this way, as shown in FIG. 12, the sender in the BIER domain 100 and the edge BFR in the BIER domain 200 can further form EBGP peers with each other, to exchange BGP messages through the BGP connection.

Figure 12:
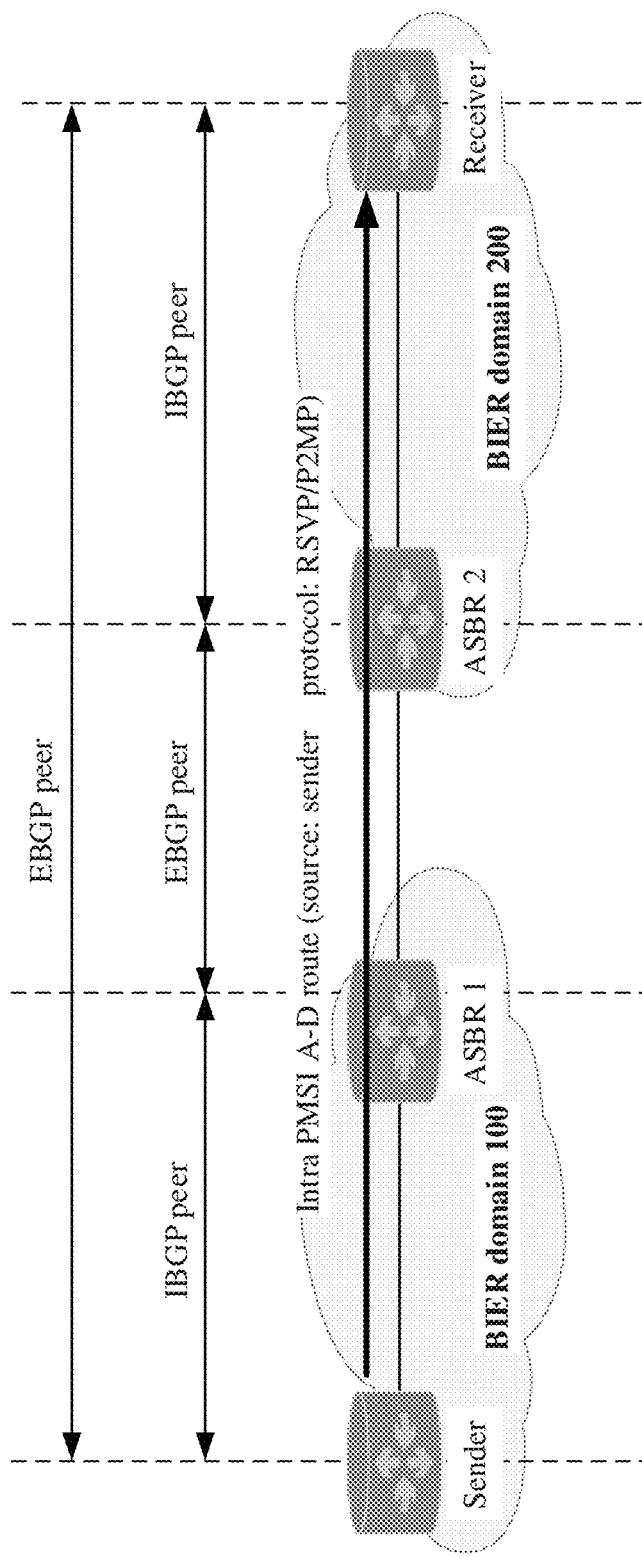
FIG. 12 is a schematic diagram of establishing a BGP peer.
Figure 13:
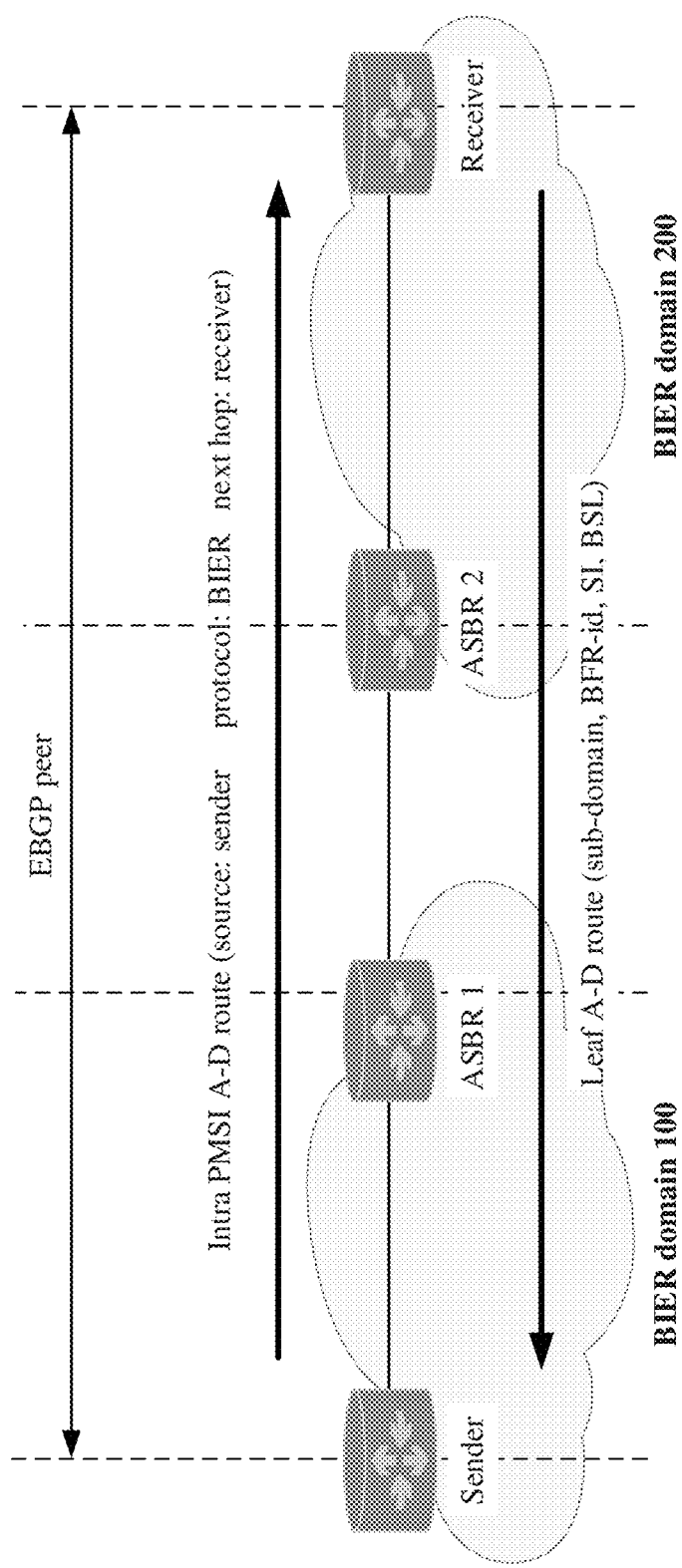
FIG. 13 is a schematic diagram of multicast information advertisement and feedback across domains.

Based on an architecture shown in FIG. 12, as shown in FIG. 13, the edge BFRs in the different BIER domains can directly exchange multicast information based on the BGP protocol. Specifically, the sender in the BIER domain 100 directly sends intra PMSI A-D routes to edge BFRs (the ASBR 2 and the BFER) in the BIER domain 200 by using the BGP message, to advertise the multicast information. The edge BFRs (the ASBR 2 and the BFER) in the BIER domain 200 directly send leaf A-D routes to the sender by using the BGP message for multicast information feedback.

FIG. 11 merely describes an example of a method for establishing the TCP connection through the bottom-layer label mapping, and should not constitute a limitation.

Figure 14A:
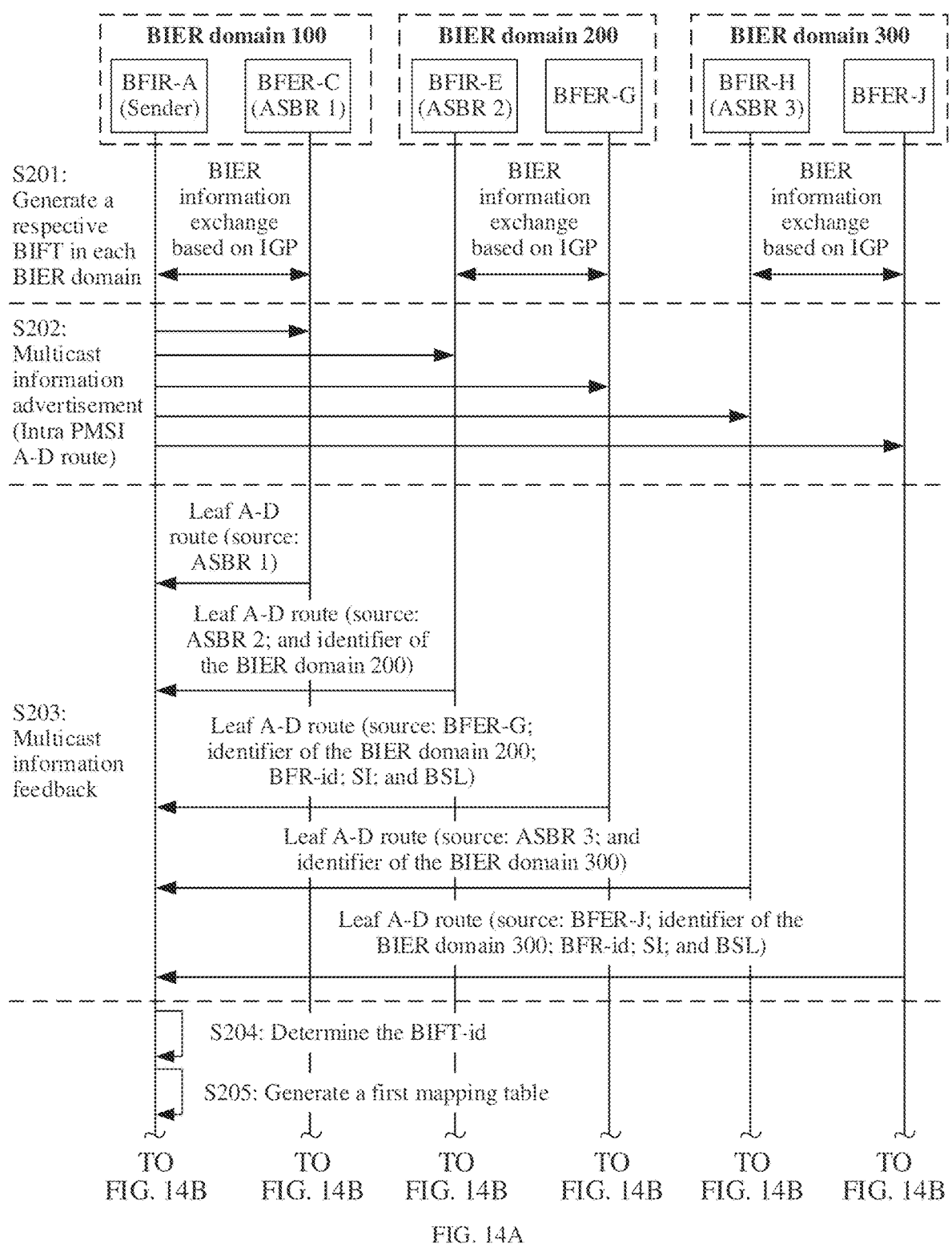
FIG. 14A and FIG. 14B are a schematic diagram of a multicast data transmission method.
Figure 14B:
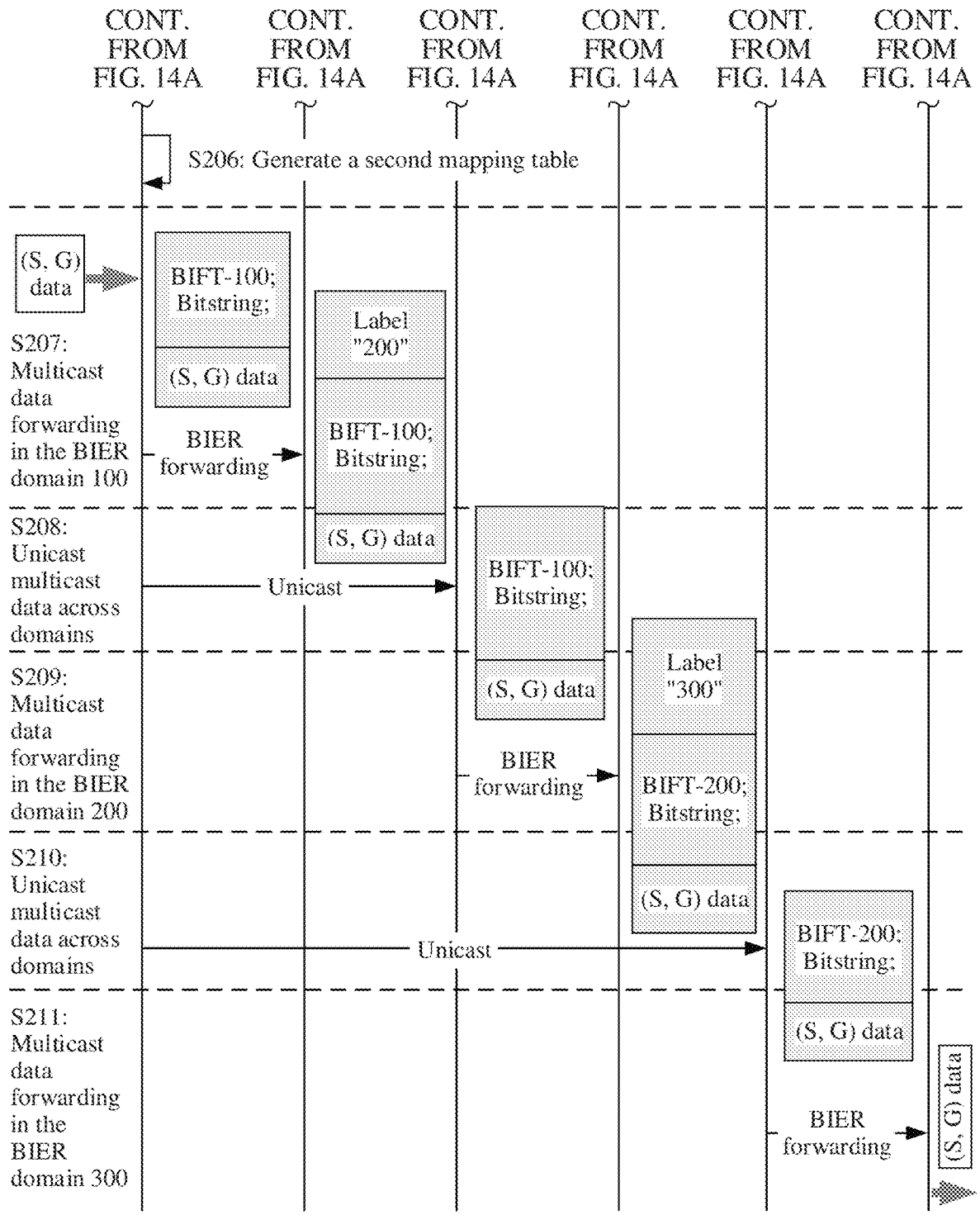

Based on the foregoing main principles and the application scenario shown in FIG. 6, the following describes in detail a multicast data transmission method. As shown in FIG. 14A and FIG. 14B, the multicast data transmission method may include the following steps.

(1) Phase 1 (S201): A BFIR and a BFR in a BIER Domain Generate Respective BIFTs.

It can be learned from the key technical point "BIFT" described in the foregoing content that, in the BIER domain, the BFIR and the BFR each can generate a BIFT being to arrive at each BFER. In addition, the BFIR may further generate a table including a correspondence between a BFR-prefix and a BFR-id for a BFER in the BIER domain in which the BFIR is located.

The BFIR and the BFR in the BIER domain generate the respective BIFTs. Therefore, after receiving a BIER data packet, the BFIR and BFR can forward the BIER data packet in multicast mode based on a BIFT-id and a bitstring in a BIER header. The BIFT-id is used to indicate a BIFT for which the BIER router searches to forward multicast data. The bitstring represents BFR-ids of all receivers (BFERs) of the multicast data.

(2) Phase 2 (S202-S203): Multicast Information Advertisement and Feedback

S202: Multicast information advertisement

Specifically, as shown in FIG. 14A and FIG. 14B, the sender in the BIER domain 100 may send an intra PMSI A-D route to the BFER-D in the BIER domain 100 by using a BGP message, and may directly send, by using the BGP message, the intra PMSI A-D route to a BGP peer (such as the BFIR-E and the BFER-G) in the BIER domain 200 and a BGP peer (such as the BFIR-E and the BFER-G) in the BIER domain 300.

In other words, the sender, and a BFIR and a BFER in another BIER domain form BGP peers. Herein, the another BIER domain is a BIER domain in which the sender is not located. The sender may directly send a BGP message to the BFIR and the BFER in the another BIER domain through a BGP connection, where the BGP message carries an intra PMSI A-D route used to advertise multicast information of a multicast group (for example, a multicast group address). Correspondingly, after the BFIR and the BFER in the another BIER domain receive the BGP message carrying the intra PMSI A-D route, if the BFIR and the BFER are interested in the multicast group advertised by the BGP message, the BFIR and the BFER feed back leaf A-D routes.

Figure 15:
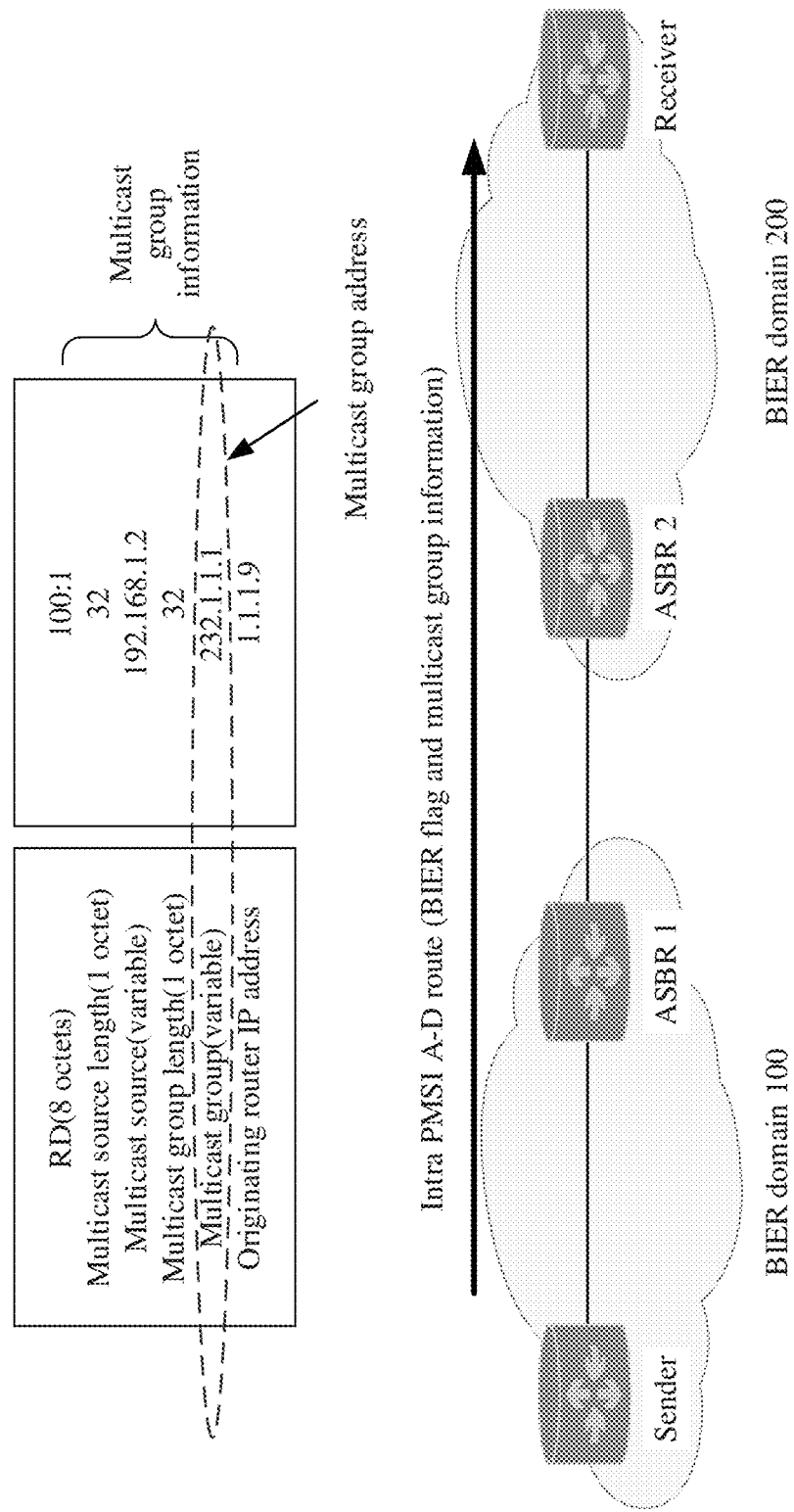
FIG. 15 is a schematic diagram of multicast information carried in an extended intra PMSI A-D route.

As shown in FIG. 15, the intra PMSI A-D route may carry a BIER identifier and an identifier of the multicast group (for example, a multicast group address 232.1.1.1). Herein, the BIER identifier is used to indicate that the BGP message carrying the intra PMSI A-D route is a BIER multicast message.

S203: Multicast information feedback

Specifically, as shown in FIG. 14A and FIG. 14B, the BFER-D in the BIER domain 100 sends the leaf A-D route to the sender by using the BGP message, to perform the multicast information feedback. For details, refer to S103 in the existing BIER-MVPN solution. The BGP peer (such as the BFIR-E and the BFER-G) in the BIER domain 200 and the BGP peer (such as the BFIR-E and the BFER-G) in the BIER domain 300 also send the leaf A-D routes to the sender separately by using the BGP message, to perform the multicast information feedback.

In other words, the BFIR and BFER in the another BIER domain each can directly send the BGP message carrying the leaf A-D route to the sender through the BGP connection. Correspondingly, the sender receives the BGP message from each of the BFIR and the BFER in the another BIER domain through the BGP connection, where the BGP message carries the leaf A-D route.

To enable the sender to know which BFERs in the BIER domain are interested in the multicast group and know how to forward the multicast data corresponding to the multicast group to the BFERs, the leaf A-D route may carry the following information.

Figure 16:
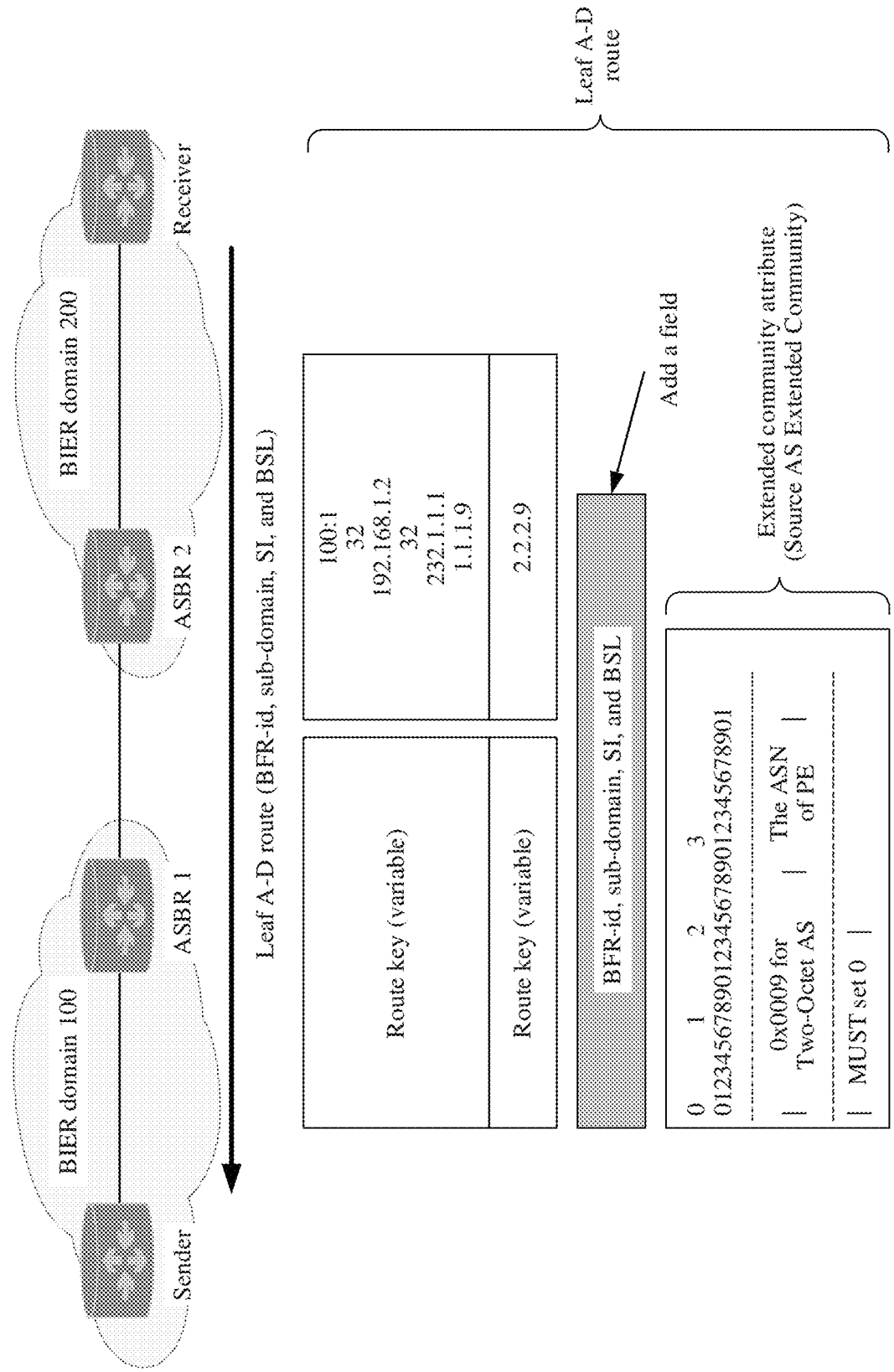
FIG. 16 is a schematic diagram of a data structure of an extended leaf A-D route fed back by a receiver BFER in another BIER domain.

First, as shown in FIG. 16, the leaf A-D route fed back by the BFER in the another BIER domain may carry a BFR-id of the BFER, a sub-domain to which the BFER belongs, an SI to which the BFR-id of the BFER belongs, a BSL supported by the BFER, and an identifier of the BIER domain to which the BFER belongs. Specifically, a field used to carry the sub-domain, the SI, the BSL, and the BFR-id may be added to the leaf A-D route, and an extended community attribute ("Source-AS extended community") is enabled to indicate the identifier of the BIER domain. In this way, the sender can determine a BIFT-id based on the three parameters: the sub-domain, the SI, and the BSL, and can determine a bitstring based on the BFR-id. Then, the sender can generate a first mapping table based on the identifier of the BIER domain, the BIFT-id, and the bitstring. For details, refer to subsequent content.

In a possible case, one BIER domain is configured with only one sub-domain. In this case, the BIFT-id may be determined based on only the two parameters the SI and the BSL. Therefore, the leaf A-D route fed back by the BFER in the another BIER domain does not need to carry the sub-domain to which the BFER belongs.

In a possible case, BSLs supported by entire multicast domains may be the same, that is, no additional notification is required, and the sender also knows the BSL. Therefore, the leaf A-D route fed back by the BFER in the another BIER domain does not need to carry the BSL.

Figure 17:
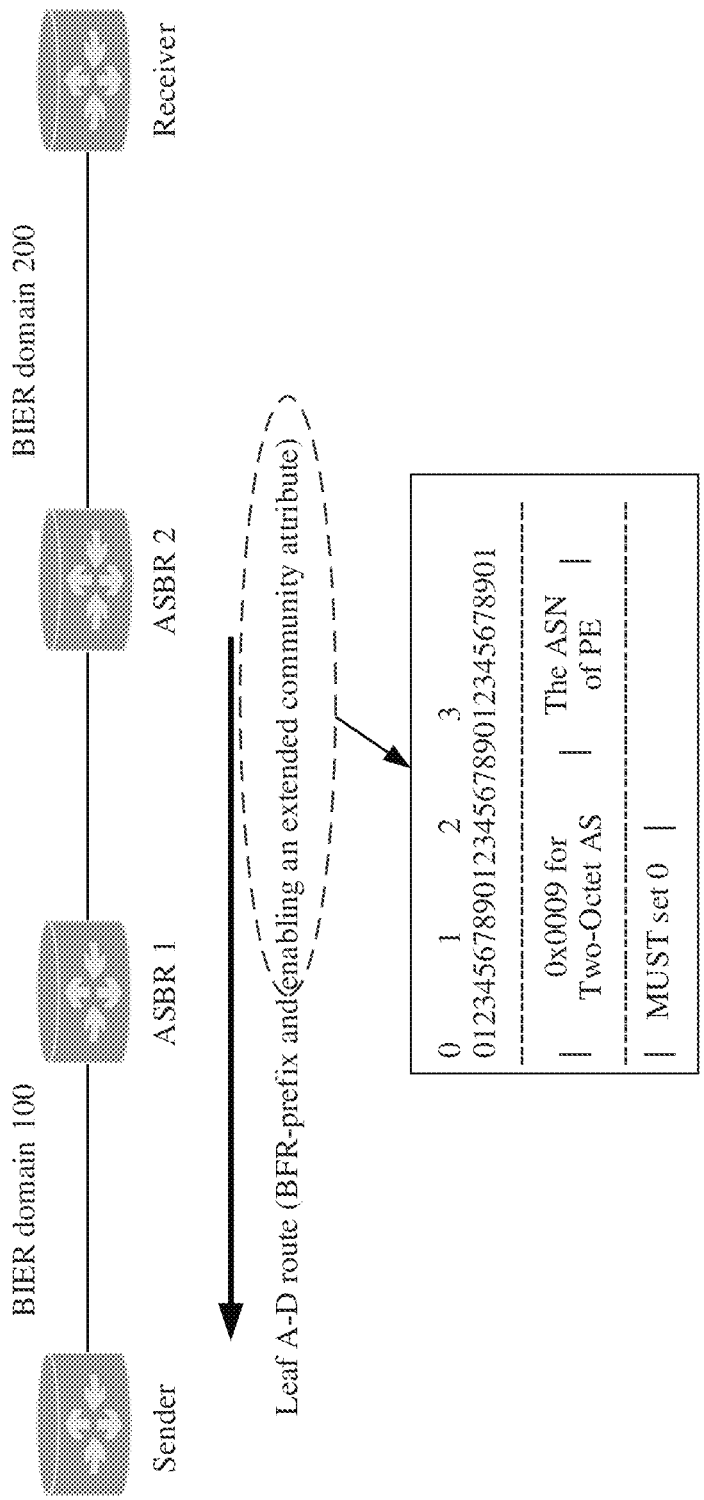
FIG. 17 is a schematic diagram of a data structure of an extended leaf A-D route fed back by a BFIR in another BIER domain.

Second, as shown in FIG. 17, the leaf A-D route fed back by the BFIR (for example, the ASBR 2) in the another BIER domain may carry a BFR-prefix of the BFIR and an identifier of the BIER domain to which the BFIR belongs. In this way, the sender can generate a second mapping table of the sender based on the information. For details, refer to subsequent content.

It can be learned from S202 to S203 that edge BFRs between different BIER domains establish a BGP peer, and can directly exchange a BGP message through a BGP connection, to implement fast advertisement and fast feedback of multicast information. In other words, multicast information advertisement and feedback do not require segment-by-segment BGP message exchange any more, but the BGP message is directly exchanged across domains. Therefore, a convergence time of the multicast advertisement and feedback is significantly shortened, and efficiency is high.

(3) Phase 3 (S204-S206): Generate a Related Mapping Table Used for Multicast Forwarding S204: Determine the BIFT-id.

Figure 18:
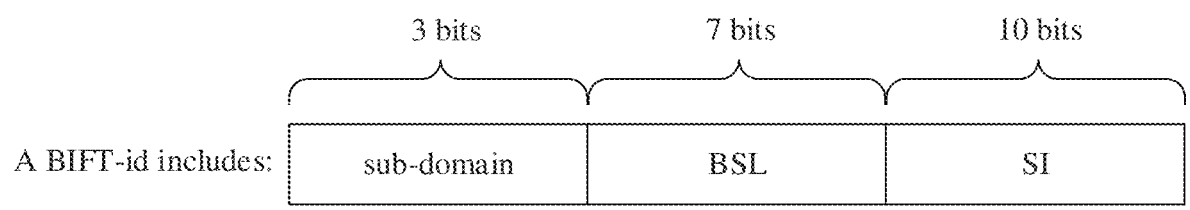
FIG. 18 is a schematic diagram of a data structure of a BIFT-id.

Specifically, as shown in FIG. 18, the BIFT-id is an index with a fixed length (for example, 20 bits), and is determined based on the three parameters: the sub-domain, the SI, and the BSL. If one BIER domain is configured with only one sub-domain, the sub-domain is optional.

Figure 19:
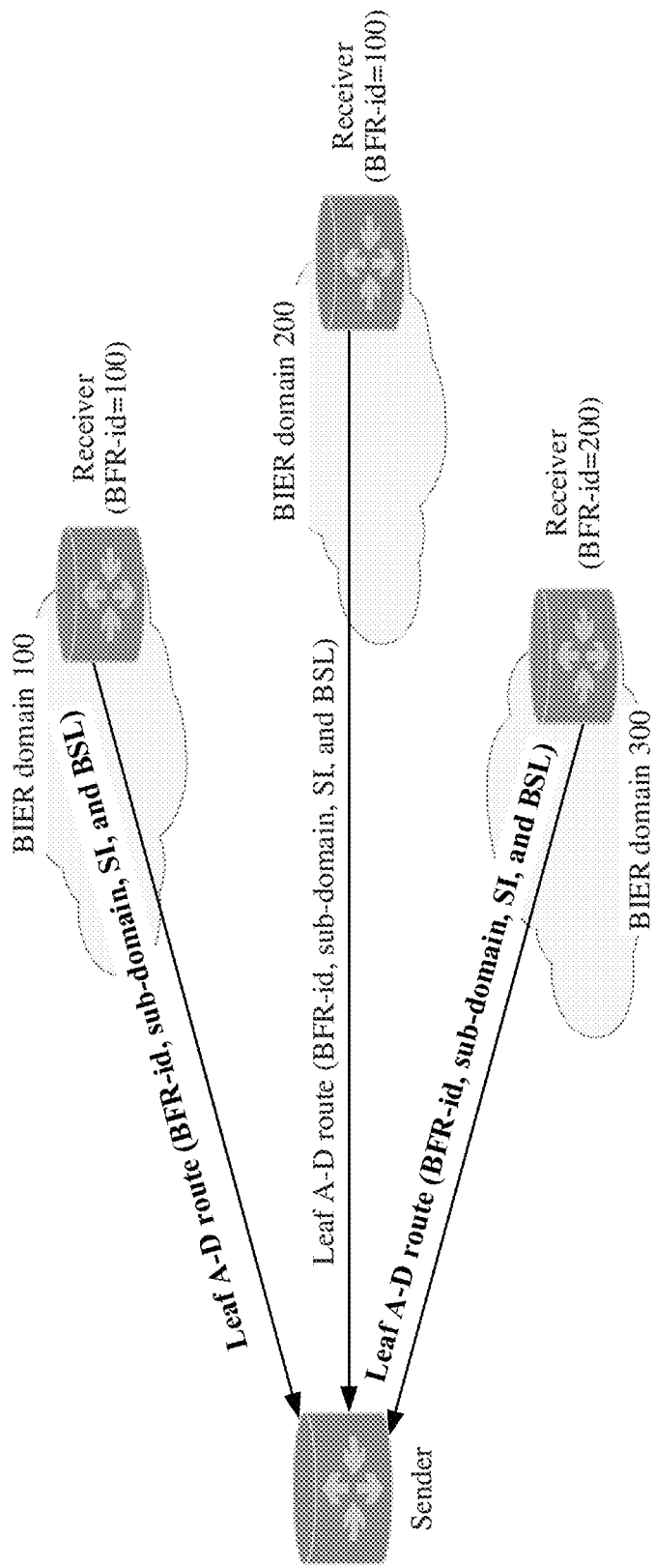
FIG. 19 is a schematic diagram of receiving BIER information from each BIER domain by a sender.

As shown in FIG. 19, the sender may determine, based on a sub-domain, an SI, and a BSL carried in a leaf A-D route from each BIER domain, a BIFT-id that respectively corresponds to a corresponding multicast group in each BIER domain. For example, the sender determines, based on a sub-domain, an SI, and a BSL carried in a leaf A-D route from the BIER domain 200, a BIFT-id that corresponds to a corresponding multicast group in the BIER domain 200. Herein, the corresponding multicast group refers to a multicast group indicated by multicast information fed back by the leaf A-D route.

Specifically, bit sequences of the sub-domain, the BSL, and the SI may be sequentially spliced to form a BIFT-id. It is assumed that a bit sequence of the sub-domain is "011", a bit sequence of the BSL is "0000100", and a bit sequence of the SI is "0001100100". The three bit sequences are sequentially spliced to form a bit sequence "01100001000001100100" with a length of 20 bits, and the bit sequence is the BIFT-id.

It can be seen that, the sub-domain, the SI, and the BSL based on which the sender determines the BIFT-id that corresponds to the corresponding multicast group in the another BIER domain are the same as the sub-domain, the SI, and the BSL based on which the BIFT-id is determined in the another BIER domain. This means that the sender can construct a BIFT-id that can be used for BIER routing and forwarding in the another BIER domain. Entire multicast domains (a plurality of BIER domains) determine the BIFT-id together. In this way, the sender can generate a BIER data packet that is to be successfully routed and forwarded in the another BIER domain.

One BIER domain may include at least one sub-domain. In this case, a BIFT-id that corresponds to a multicast group in a BIER domain is a BIFT-id that respectively corresponds to the multicast group in the at least one sub-domain, and a bitstring that corresponds to a multicast group in a BIER domain is a bitstring that respectively corresponds to the multicast group in the at least one sub-domain. This means that, for multicast data to be sent to the BIER domain, the sender needs to construct a BIER header for the at least one sub-domain respectively, and then encapsulate a BIER data packet for the at least one sub-domain respectively, where different sub-domains correspond to different BIER headers.

A BIFT-id that respectively corresponds to a multicast group in each BIER domain is a BIFT-id that respectively corresponds to multicast data corresponding to the multicast group in each BIER domain. A bitstring that respectively corresponds to a multicast group in each BIER domain is a bitstring that respectively corresponds to multicast data corresponding to the multicast group in each BIER domain.

S205: Generate the first mapping table.

Figure 20:
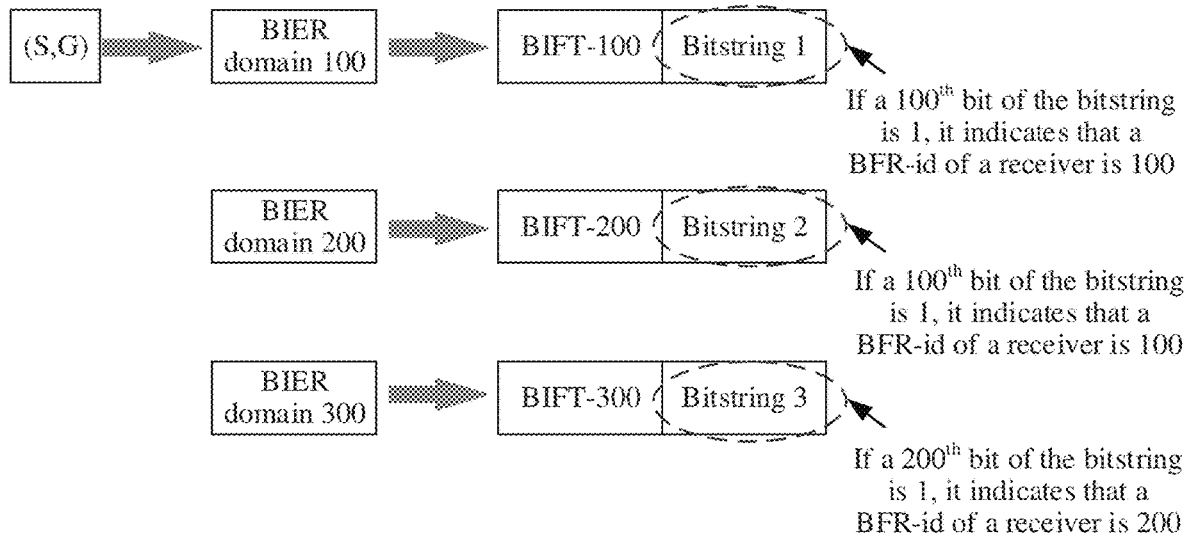
FIG. 20 is a schematic diagram of a first mapping table.

Specifically, the sender generates, based on a BIER domain identifier, a BIFT-id, and a bitstring of each BIER domain, a first mapping table shown in FIG. 20 as an example. The first mapping table may include a BIFT-id and a bitstring that correspond to multicast group in at least one BIER domain. As shown in FIG. 20, the at least one BIER domain may include a BIER domain in which the sender is located and a BIER domain (that is, the another BIER domain) in which the sender is not located.

The first mapping table may include a correspondence between a multicast group identifier (for example, a multicast group address) and an identifier of a BIER domain, a BIFT-id, and a bitstring. An identifier of a BIER domain, a BIFT-id, and a bitstring that correspond to a multicast group identifier represent, in the BIER domain represented by the identifier of the BIER domain, a BIFT-id and a bitstring that correspond to a multicast group represented by the multicast group identifier.

In the first mapping table, a BIFT-id that corresponds to a multicast group in the another BIER domain is determined based on a sub-domain to which a receiver of the another BIER domain belongs, an SI to which a BFR-id of the receiver belongs, and a BSL supported by the receiver. A bitstring that corresponds to the multicast group in the another BIER domain is determined based on the BFR-id of the receiver. Herein, the receiver refers to a BFER that is interested in the multicast group in the another BIER domain.

The first mapping table may be used to construct the BIER header. For a multicast group, a BIER header of the multicast group is constructed only on a sender side, and no intermediate device is required to participate in reconstruction of the BIER header.

S206: Generate the second mapping table of the sender.

For the another BIER domain, the sender independently determines a next hop (that is, uses the BFIR in the another BIER domain as the next hop), instead of using a directly adjacent BFR (that is, a BFR-NBR) as the next hop. In this way, the multicast data to be sent to the another BIER domain does not need to be forwarded by a BFR in the BIER domain in which the sender is located. Therefore, the multicast data can be directly sent to the BFIR in the another BIER domain after MPLS or GRE encapsulation, and forwarding efficiency is improved.

For a specific other BIER domain, next hops of the sender in the BIER domain may be a plurality of BFIRs in the BIER domain, that is, there are a plurality of next hops. A part of the plurality of BFIRs may be responsible for forwarding the multicast data to some sub-domains in the BIER domain, and the other part of the plurality of BFIRs may be responsible for forwarding the multicast data to some other sub-domains in the BIER domain. In this way, for the multicast data sent to the BIER domain, the sender may determine, based on a BIFT-id (a BIFT-id is in one-to-one correspondence with a sub-domain) that corresponds to the multicast data in the BIER domain, a BFIR to which the multicast data is to be forwarded. Because the BIFT-id can indicate a sub-domain to which the multicast data is to be sent. That the plurality of BFIRs are respectively responsible for forwarding the multicast data to which sub-domain (or sub-domains) is not limited and may be determined based on an actual requirement. For example, a data forwarding volume carried by each of the plurality of next hops may be set from a perspective of load balancing.

For a specific other BIER domain, a next hop of the sender in the BIER domain may be one BFIR in the BIER domain, that is, there is only one next hop. The BFIR may be responsible for forwarding the multicast data to all target sub-domains in the BIER domain. Herein, the target sub-domain is a sub-domain in which a receiver of the multicast data is located.

Figure 21:
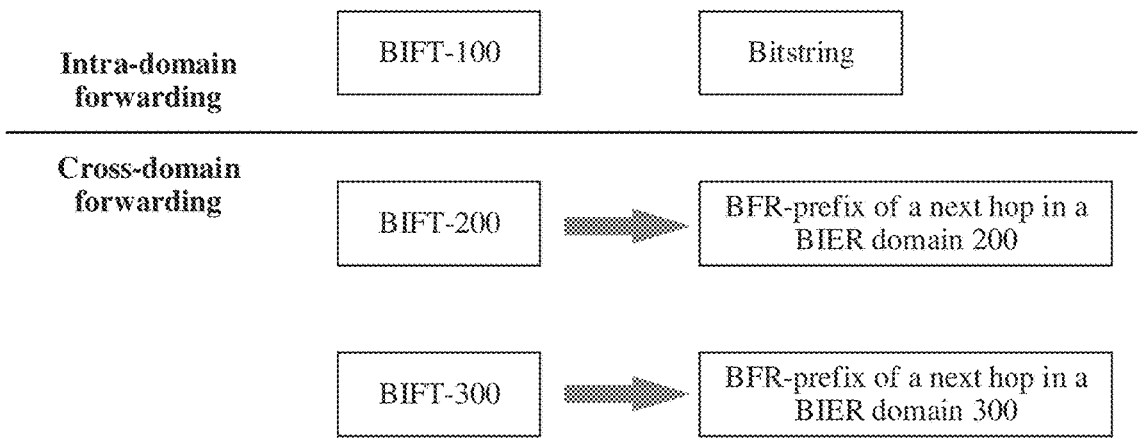
FIG. 21 is a schematic diagram of a second mapping table of a sender.

The sender may generate, based on the independently determined next hop, a second mapping table shown as an example in FIG. 21. The second mapping table may include a BIFT-id that respectively corresponds to the multicast group in at least one BIER domain and a BFR-prefix of a next hop of the sender in the at least one BIER domain. As shown in FIG. 21, the at least one BIER domain may include a BIER domain in which the sender is located and a BIER domain (that is, the another BIER domain) in which the sender is not located. In the BIER domain in which the sender is located, referring to the existing BIER-MVPN solution, the next hop of the sender may be a BFR-NBR. In the another BIER domain, the next hop of the sender may be the BFIR of the another BIER domain.

The second mapping table may include a correspondence between a multicast group identifier (for example, a multicast group address) and an identifier of a BIER domain, a BIFT-id, and a BFR-prefix. An identifier of a BIER domain, a BIFT-id, and a BFR-prefix that correspond to a multicast group identifier represent, in the BIER domain represented by the identifier of the BIER domain, a BIFT-id and a BFR-prefix of a logical next hop that correspond to a multicast group represented by the multicast group.

For a specific other BIER domain, when the sender has a plurality of next hops in the BIER domain, (one or more) BIFT-ids corresponding to a domain identifier of the BIER domain in the second mapping table correspond to a plurality of BFR-prefixes; or when the sender has only one next hop in the BIER domain, (one or more) BIFT-ids corresponding to a domain identifier of the BIER domain in the second mapping table correspond to one BFR-prefix.

The second mapping table may be used to add an MPLS label or a GRE label to a BIER data packet obtained by encapsulating the multicast data, to implement cross-domain (inter-domain) forwarding. For example, the sender may determine, based on the BIFT-id carried in the BIER header of the BIER data packet, a target BIER domain to which the BIER data packet is to be sent. Then, after adding an MPLS label or a GRE label to the BIER data packet, the sender may send the BIER data packet to a next hop of the sender in the target BIER domain. For details, refer to subsequent content.

Optionally, the sender may configure an egress port for sending the multicast data to at least one BIER domain. The second mapping table may further include an identifier of the egress port. In this way, the sender can know which egress port is used to forward the multicast data to a specific BIER domain.

Optionally, the first mapping table and the second mapping table may be two independent mapping relationships, that is, two tables. Alternatively, the first mapping table and the second mapping table may exist in a mapping relationship, that is, two parts of a table. The first mapping table and the second mapping table do not need to be in a tabular form.

(4) Phase 4: Multicast Data Forwarding (S207 to S211): The Intra-Domain Forwarding and the Inter-Domain Forwarding S207: Multicast data forwarding in the BIER domain 100.

Specifically, when multicast data arrives, the sender may determine, from the first mapping table, a BIFT-id and a bitstring that correspond to the multicast data in the BIER domain 100. The BIFT-id and the bitstring that correspond to the multicast data in the BIER domain 100 are respectively a BIFT-id and a bitstring that correspond to a multicast group corresponding to the multicast data in the BIER domain 100. The first mapping table is generated in S205.

Then, the sender may generate a BIER header by using the bitstring and the BIFT-id, and performs BIER encapsulation on the multicast data to obtain a BIER data packet. In this way, the sender and a transit BFR in the BIER domain 100 can forward the multicast data to a receiver in the BIER domain 100 based on the BIER header and a BIER forwarding mechanism.

Correspondingly, the receiver in the BIER domain 100 receives the BIER data packet, and then may decapsulate the BIER data packet to obtain the multicast data, and send the multicast data to a user side device.

S208: The sender (in the BIER domain 100) unicasts the multicast data to a BFIR in the BIER domain 200.

Specifically, when multicast data arrives, the sender may determine, from the first mapping table, a BIFT-id and a bitstring that correspond to the multicast data in the BIER domain 200, generate a BIER header by using the bitstring and the BIFT-id, and perform BIER encapsulation on the multicast data to obtain a BIER data packet. The first mapping table is generated in S205.

Then, the sender may determine, from the second mapping table generated in S206, a BFR-prefix of a next-hop of the sender in the BIER domain 200 based on the BIFT-id in the BIER header. In addition, the sender may add an MPLS label or a GRE label to the BIER data packet by using the BFR-prefix, and send the labeled BIER data packet to a BFIR in the BIER domain 200.

Correspondingly, the BFIR in the BIER domain 200 may receive the labeled BIER data packet, and may remove the label to obtain the BIER data packet.

S209: Forward the multicast data in the BIER domain 200 based on the BIER forwarding mechanism.

The BFIR and a transit BFR in the BIER domain 200 may obtain the BIFT-id and the bitstring from the BIER header of the BIER data packet, and finally forward the BIER data packet to a receiver in the BIER domain 200 based on a BIFT indicated by the BIFT-id and the bitstring. For details, refer to S108 and S110 in the existing BIER-MVPN solution. Details are not described herein.

Correspondingly, the receiver in the BIER domain 200 receives the BIER data packet, and then may decapsulate the BIER data packet to obtain the multicast data, and send the multicast data to the user side device.

S210 to S211 describe a process of forwarding the multicast data to a receiver in the BIER domain 300. The process is the same as a process of forwarding the multicast data to the receiver in the BIER domain 200, and is not further described herein.

Based on the S207 to S211, the multicast data forwarding is summarized as follows:

1. BIER inter-domain multicast data forwarding (S208 and S210): For the multicast data to be sent to the another BIER domain, the sender performs BIER encapsulation on the multicast data to obtain the BIER data packet, adds the MPLS label or the GRE label to the BIER data packet, and then unicasts the BIER data packet to a BFIR in the another BIER domain.

2. BIER intra-domain multicast data forwarding (S207, S209, and S211): The multicast data is forwarded based on the BIER mechanism. For details, refer to the existing BIER-MVPN

SOLUTION

It can be learned that, different from the existing BIER-MVPN solution, the multicast data forwarding is not segmental. The BIER header is constructed only on the sender side, and an intermediate device (for example, a BFIR and a BFER of each BIER domain along a path) is not required to participate in generation of the BIER header any more. In this way, multicast forwarding is more efficient.

Figure 22:
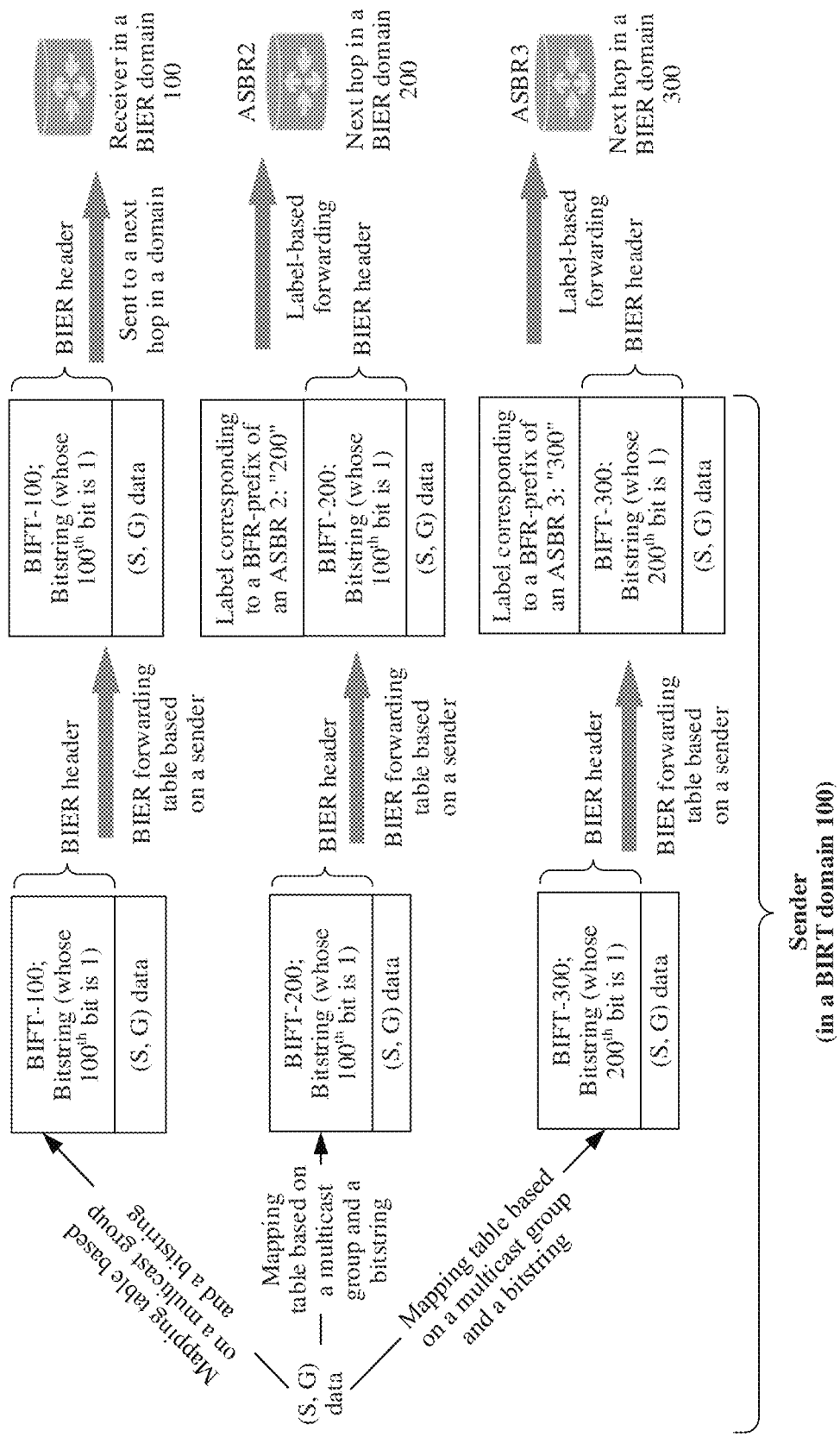
FIG. 22 is a schematic diagram of an operating principle of forwarding multicast data by a sender.

A key operation of the multicast data forwarding is performed by the sender. An operating principle of the sender may be shown in FIG. 22 as an example. For multicast data to be sent to a plurality of BIER domains, the sender first replicates the multicast data, and then constructs, based on the first mapping table generated in S205, BIER headers for the multicast data to be sent to different BIER domains to obtain BIER data packets. Then, the sender may label, based on the second mapping table generated in S206, the BIER data packet to be sent to the another BIER domain, and unicast the BIER data packet to a next hop of the sender in the another BIER domain. For a BIER data packet to be sent in a domain (that is, the BIER domain in which the sender is located), the sender forwards the multicast data based on the BIER forwarding mechanism. For details, refer to the existing BIER-MVPN solution.

The following uses an example to describe specific implementation of the multicast data forwarding method.

Figure 23:
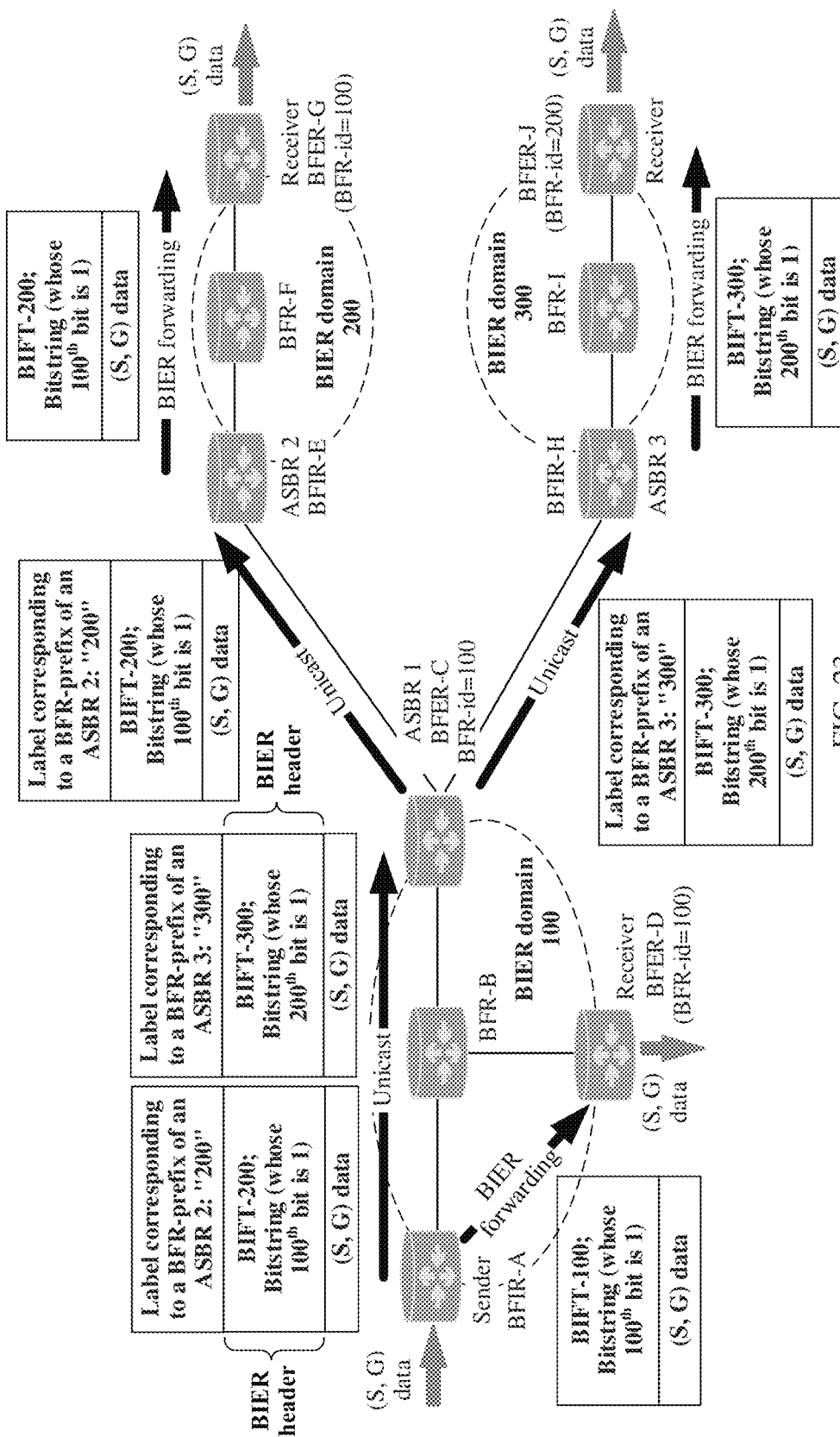
FIG. 23 is a schematic diagram of multicast data forwarding in a multicast domain.

In the example shown in FIG. 23, it is assumed that receivers interested in a multicast group (S, G) are: a BFER-D (whose BFR-id is 100) in a BIER domain 100, a BFER-G (whose BFR-id is 100) in a BIER domain 200, and a BFER-J (whose BFR-id is 200) in a BIER domain 300. A label corresponding to a BFR-prefix of the BFER-G is "200", and a label corresponding to a BFR-prefix of the BFER-J is "300". As shown in FIG. 23, when multicast data corresponding to the multicast group (S, G) arrives, a forwarding process of the multicast data is as follows.

1. The sender makes three copies of the multicast data.

2. The sender encapsulates BIER headers for the three copies of the multicast data based on the first mapping table. A BIER header encapsulated in the multicast data to be sent to the BFER-D includes a BIFT-id (that is, BIFT-100) that corresponds to the multicast data in the BIER domain 100 and a bitstring (whose 100th bit is 1) that corresponds to the multicast data in the BIER domain 100. A BIER header encapsulated in the multicast data to be sent to the BFER-G includes a BIFT-id (that is, BIFT-200) that corresponds to the multicast data in the BIER domain 200 and a bitstring (whose 100th bit is 1) that corresponds to the multicast data in the BIER domain 200. A BIER header encapsulated in the multicast data to be sent to the BFER-J includes a BIFT-id (that is, BIFT-300) that corresponds to the multicast data in the BIER domain 300 and a bitstring (whose 200th bit is 1) that corresponds to the multicast data in the BIER domain 300.

3. Forward the multicast data in the BIER domain 100 based on the BIER forwarding mechanism. For details, refer to the existing BIER-MVPN solution. After receiving the BIER data packet, the receiver in the BIER domain 100 may decapsulate the BIER data packet, read the multicast data, and forward the multicast data to the user side device.

4. The sender adds a label "200" to the BIER data packet and unicasts the BIER data packet with the label "200" to a BFIR-E (that is, the ASBR 2) in the BIER domain 200. After receiving the BFIR-E in the BIER domain 200, the BFIR-E in the BIER domain 200 may remove the label "200" to obtain the BIER data packet. Forward the multicast data in the BIER domain 200 based on the BIER forwarding mechanism. For details, refer to the existing BIER-MVPN solution. After receiving the BIER data packet, the receiver in the BIER domain 200 may decapsulate the BIER data packet, read the multicast data, and forward the multicast data to the user side device.

5. The sender adds a label "300" to the BIER data packet and unicasts the BIER data packet with the label "300" to a BFIR-H (that is, an ASBR 3) in the BIER domain 300. After receiving the BFIR-H in the BIER domain 300, the BFIR-H in the BIER domain 300 may remove the label "300" to obtain the BIER data packet. Forward the multicast data in the BIER domain 300 based on the BIER forwarding mechanism. For details, refer to the existing BIER-MVPN solution. After receiving the BIER data packet, the receiver in the BIER domain 200 may decapsulate the BIER data packet, read the multicast data, and forward the multicast data to the user side device.

It can be seen from the example shown in FIG. 23 that, different from the existing BIER-MVPN solution, the multicast data to be sent to the receiver in the another BIER domain (for example, the BIER domain 200) is not required to be forwarded by segment through BFRs in the BIER domain 100 and the BIER domain 200 any more, an intermediate device (for example, the BFIR in the BIER domain 200) does not participate in generation of the BIER header. In this way, multicast forwarding is more efficient.

Expansion Solution

Figure 24A:
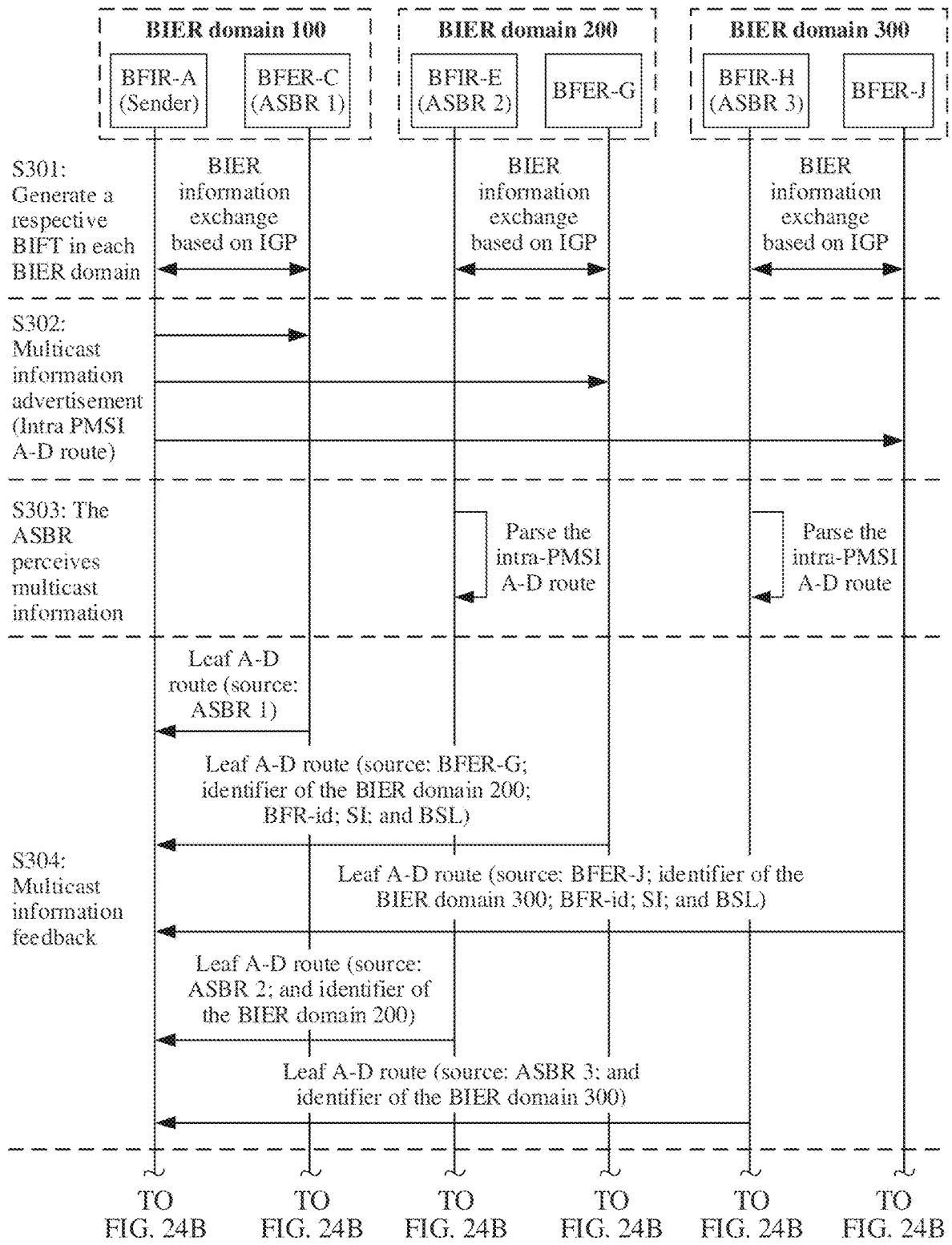
FIG. 24A and FIG. 24B are a schematic flowchart of another multicast data transmission method.
Figure 24B:
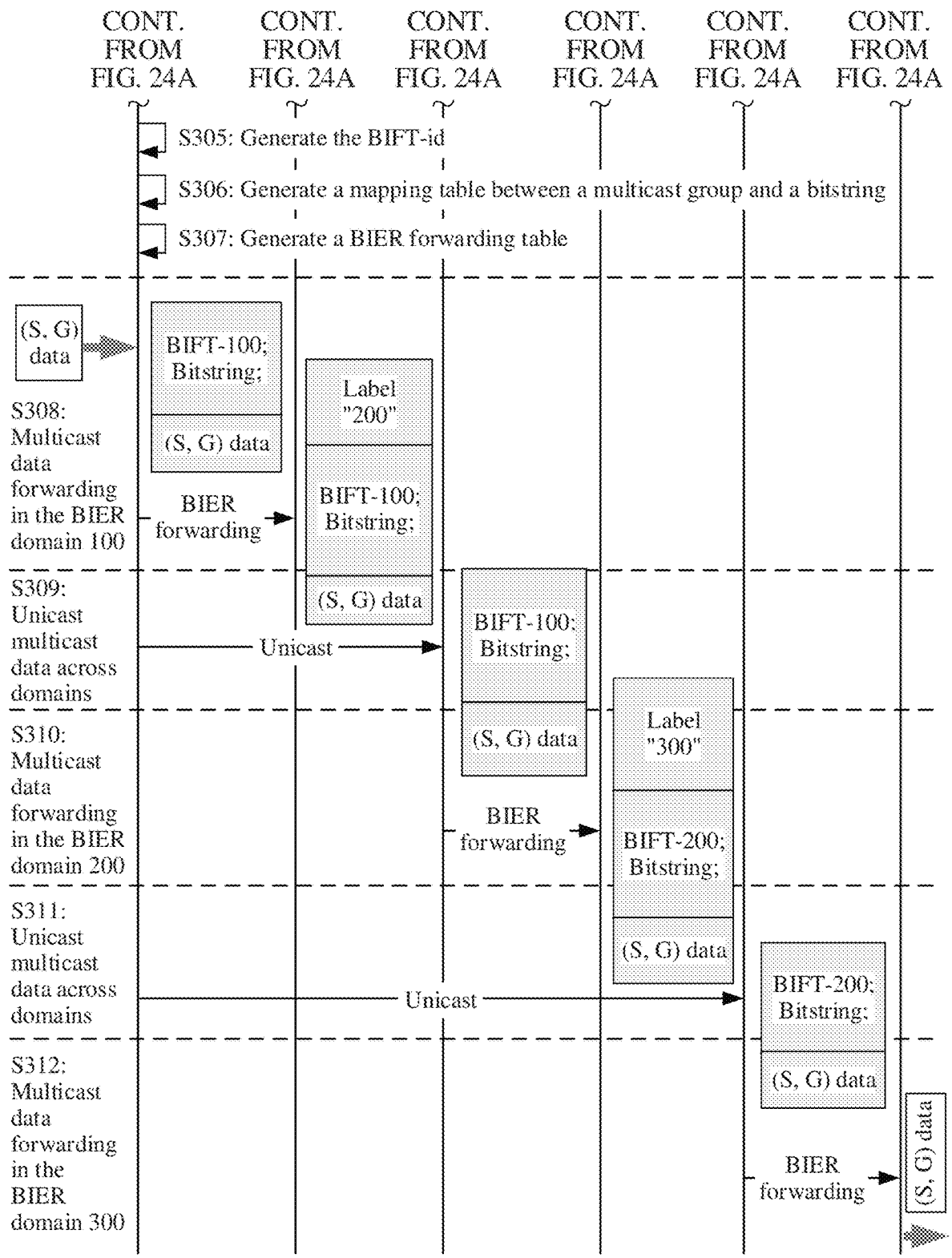

In some optional embodiments, the sender may not send a BGP message to a BFIR in the another BIER domain to advertise multicast information, but the BFIR in the another BIER domain can perceive and parse the intra PMSI A-D route carried in the BGP message. This extension solution may be shown in FIG. 24A and FIG. 24B, and includes the following content.

(1) Phase 1 (S301): A BFIR and a BFR in a BIER domain generate respective BIFTs.

For details, refer to S201 in the embodiment in FIG. 14A. Details are not described herein.

(2) Phase 2 (S302 to S304): Multicast information advertisement and feedback Different from the multicast information advertising and feedback (S202 to S203) in the embodiment in FIG. 14B, the sender no more sends the BGP message to the BFIR in the another BIER domain to advertise the multicast information, but the BFIR in the another BIER domain can perceive and parse the intra PMSI A-D route carried in the BGP message. For details, refer to S302 to S303.

To narrow down a range, the BFIR in the another BIER domain can parse only intra PMSI A-D routes whose types (Route type) are 1, 2, 3, and 5 that can be used to advertise the multicast information, and then parse PMSI tunnel attributes carried in the intra PMSI A-D routes. If the PMSI tunnel attribute contains a BIER identifier, the BFIR in the another BIER domain sends a leaf A-D route to the sender. For the intra PMSI A-D route including the BIER identifier, refer to FIG. 9.

(3) Phase 3 (S305 to S307): Generate a related mapping table used for multicast forwarding For details, refer to S204 to S206 in the embodiment in FIG. 14A and FIG. 14B. Details are not described herein.

(4) Phase 4: Multicast data forwarding (S308 to S312): the intra-domain forwarding and the inter-domain forwarding For details, refer to S307 to S311 in the embodiment in FIG. 14B. Details are not described herein.

Figure 25:
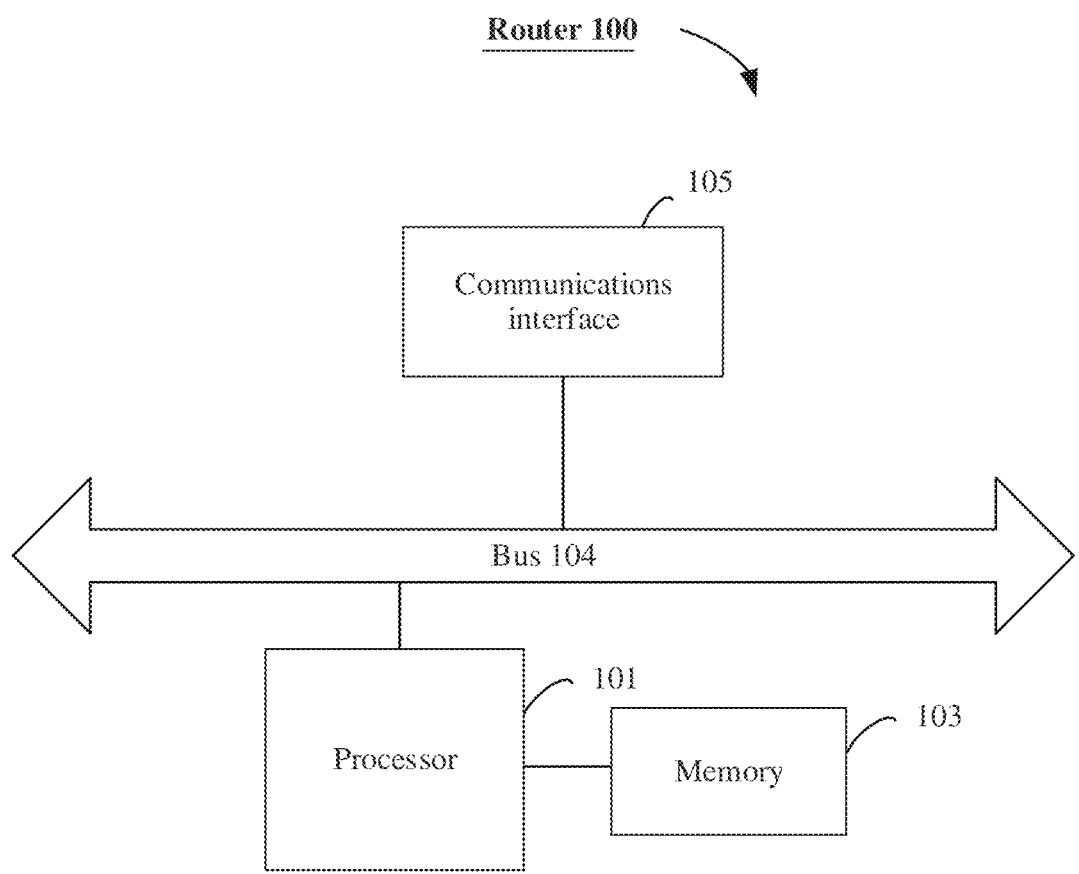
FIG. 25 is a schematic structural diagram of a router.

FIG. 25 shows a router 100 according to some embodiments. The router 100 is a BFR in a BIER domain, and may be implemented as a BFIR in the BIER domain, or may be implemented as a transit BFR in the BIER domain, or may be implemented as a BFER in the BIER domain. As shown in FIG. 25, the router 100 may include one or more processors 101, a memory 103, and a communications interface 105. These components may be connected to each other through a bus 104 or in another manner. In FIG. 25, an example in which the components are connected through a bus is used.

The communications interface 105 may be used by the router 100 to communicate with another communications device, for example, another router. Specifically, the communications interface 105 may include a wired communications interface, for example, a wide area network (WAN) interface or a local area network (LAN) interface. The communications interface 105 is not limited to a wired communications interface. In some possible embodiments, the communications interface 105 may further include a wireless communications interface, for example, a wireless LAN (WLAN) interface.

The memory 103 is coupled to the processor 101, and is configured to store various software programs and/or a plurality of groups of instructions. Specifically, the memory 103 may include a high-speed random access memory, and may also include a non-volatile memory, for example, one or more magnetic disk storage devices, flash memory devices, or other non-volatile solid-state storage devices. The memory 103 may store an operating system (briefly referred to as a system below), for example, an embedded operating system such as uCOS, VxWorks, or RTLinux. The memory 103 may further store a network communication program. The network communication program may be used to communicate with one or more additional devices, one or more user equipments, and one or more network devices.

In some embodiments, the router 100 may be implemented as the sender in the foregoing method embodiments, for example, the BFIR-A in the BIER domain 100 in FIG. 6. The memory 103 may be configured to store an implementation program on a sender side that is of the multicast data transmission method provided in one or more embodiments. The processor 101 may be configured to read and execute a computer-readable instruction. Specifically, the processor 101 may be configured to invoke a program stored in the memory 103, for example, an implementation program on the sender side that is of the multicast data transmission method provided in the one or more embodiments, and execute an instruction included in the program. For implementation of the multicast data transmission method provided in the one or more embodiments on the sender side, refer to the foregoing method embodiments.

In some embodiments, the router 100 may be implemented as a BFIR in another domain (for example, the ASBR 2 in the BIER domain 200 in FIG. 6) in the foregoing method embodiments. The memory 103 may be configured to store an implementation program on the BFIR side that is of the multicast data transmission method provided in one or more embodiments. The processor 101 may be configured to read and execute a computer-readable instruction. Specifically, the processor 101 may be configured to invoke a program stored in the memory 103, for example, a program for implementing on the BFIR side that is of the multicast data transmission method provided in one or more embodiments, and execute an instruction included in the program. For implementation of the multicast data transmission method provided in the one or more embodiments on the BFIR side, refer to the foregoing method embodiments.

In some embodiments, the router 100 may be implemented as a receiver in another domain (for example, the BFER-G in the BIER domain 200 in FIG. 6) in the foregoing method embodiments. The memory 103 may be configured to store an implementation program on the receiver side that is of the multicast data transmission method provided in one or more embodiments. Specifically, the processor 101 may be configured to invoke a program stored in the memory 103, for example, an implementation program on the receiver side that is of the multicast data transmission method provided in the one or more embodiments, and execute an instruction included in the program. For implementation of the multicast data transmission method provided in the one or more embodiments on the receiver side, refer to the foregoing method embodiments.

It may be understood that the router 100 shown in FIG. 25 is merely an implementation of this embodiment. In actual application, the router 100 may further include more or fewer components. This is not limited herein.

Figure 26:
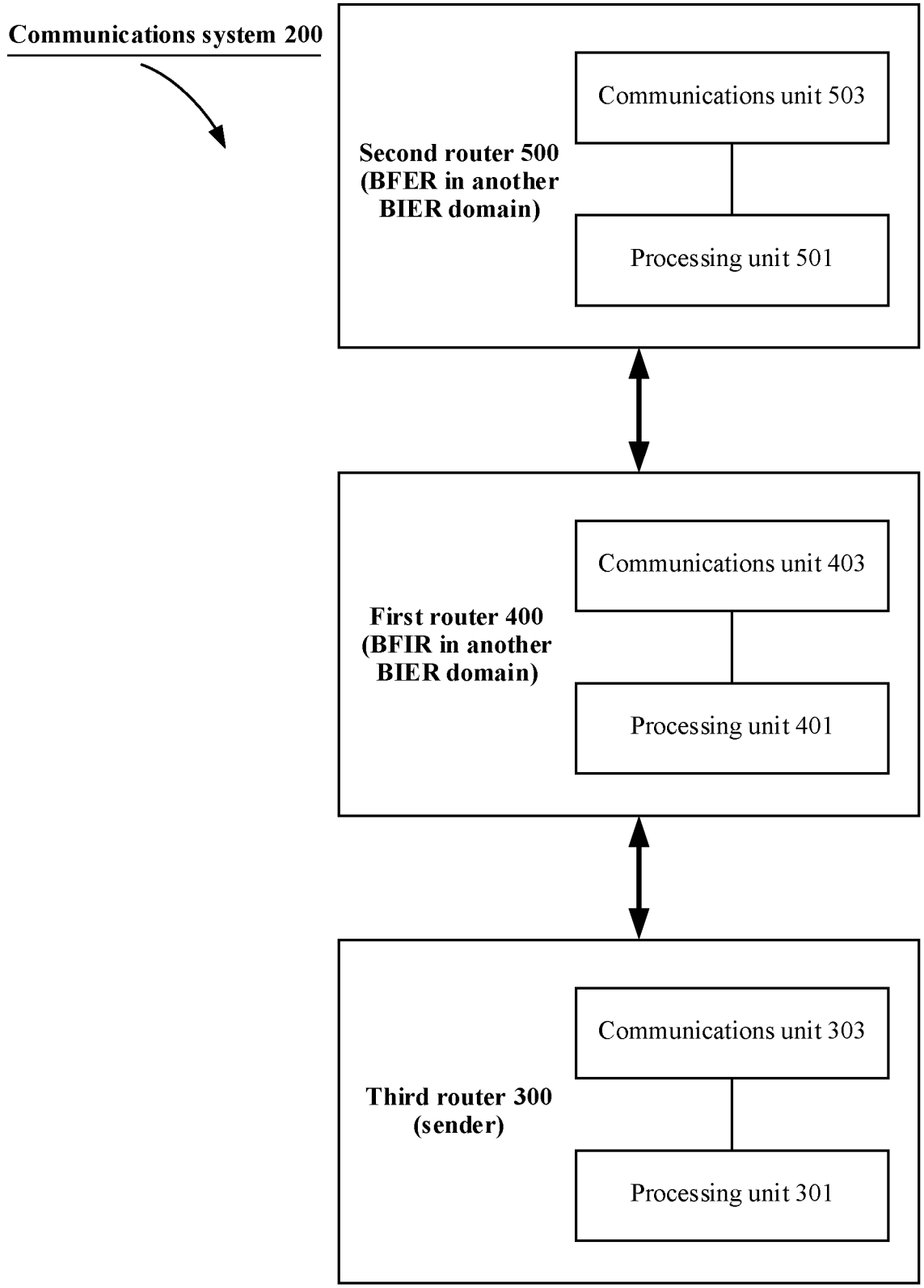
FIG. 26 is a schematic structural diagram of a communications system and a related apparatus.

FIG. 26 shows another communications system and a related apparatus. The communications system 200 may include the following communications apparatuses: at least one first router 400 and at least one second router 500. The first router 400 and the second router 500 are located in a same BIER domain. The first router 400 may be a BFIR in the another BIER domain in the foregoing method embodiments, and the second router 500 may be a receiver BFER in the another BIER domain in the foregoing method embodiments. Optionally, the communications system 200 may further include at least one third router 300. A BIER domain in which the third router 300 is located is different from the BIER domain in which the first router 400 and the second router 500 are located. The third router 300 may be the sender in the foregoing method embodiments. The communications system 200 and the communications apparatuses in the communications system 200 may implement the multicast data transmission method described in the embodiment in FIG. 14A and FIG. 14B or FIG. 24A and FIG. 24B. Details are described below.

As shown in FIG. 26, the third router 300 may include a processing unit 301 and a communications unit 303.

The processing unit 301 may be configured to determine, from a first mapping table, a BIFT-id and a bitstring that correspond to multicast data in another BIER domain, where the BIFT-id is determined based on at least an SI to which an BFR-id of the second router 500 in the another BIER domain belongs and a BSL supported by a first BFER, the bitstring is determined based on at least the BFR-id of the second router 500, the second router 500 is a BFER in the another BIER domain that is configured to receive the multicast data, and the first mapping table includes a BIFT-id and a bitstring that correspond to the multicast data in at least one BIER domain.

The processing unit 301 may be further configured to encapsulate the multicast data into a BIER data packet, where a BIER header of the BIER data packet includes the BIFT-id and the bitstring that correspond to the multicast data in the another BIER domain.

The processing unit 301 may be further configured to label the BIER data packet, where the label is a label corresponding to a prefix of a BFIR in the another BIER domain.

The communications unit 303 may be configured to send the labeled BIER data packet to the first router 400 in the another BIER domain.

Herein, the another BIER domain is a BIER domain in which the third router 300 is not located. The label may be an MPLS label or a GRE label.

It may be understood that different from an existing BIER-MVPN solution, multicast data forwarding is not segmental. The BIER header is constructed only on a side of the third router 300, and an intermediate device (for example, a BFIR and a BFER of each BIER domain along a path) is not required to participate in generation of the BIER header any more. In this way, multicast forwarding is more efficient.

In some optional embodiments, the processing unit 301 may be further configured to: before labeling the BIER data packet, determine a prefix of a logical next hop of the third router 300 in the another BIER domain from a second mapping table based on the BIFT-id that corresponds to the multicast data in the another BIER domain. The logical next hop of the third router 300 is a BFIR in the another BIER domain. The second mapping table includes a BIFT-id that respectively corresponds to the multicast data in at least one BIER domain and a prefix of a logical next hop of the third router 300 in the at least one BIER domain.

In this way, for the another BIER domain, the third router 300 can independently determine a next hop (that is, use the BFIR of the another BIER domain as the next hop), instead of using a directly adjacent BFR (that is, a BFR-NBR) as the next hop, so that the multicast data sent to the another BIER domain does not need to be forwarded by a BFR in the BIER domain in which the third router 300 is located. Therefore, the multicast data can be directly sent to the BFIR in the another BIER domain after MPLS or GRE encapsulation, and forwarding efficiency is improved.

In some optional embodiments, the second mapping table may further include an identifier of a port that is on the third router 300 and that is separately used to send the multicast data to the at least one BIER domain. Specifically, the processing unit 301 may be further configured to determine, from the second mapping table based on the BIFT-id that corresponds to the multicast data in the another BIER domain, an identifier of a first port used to send the multicast data to the another BIER domain. Then, the communications unit 303 may be further configured to send the labeled BIER data packet to the first router 400 in the another BIER domain through the first port.

The third router 300 forms a BGP peer with the first router 400 and the second router 500 in the another BIER domain. Before forwarding the multicast data to a BFIR in the another BIER domain, the third router 300 may know, through multicast information advertisement and feedback, which BFERs in the BIER domain are interested in a multicast group. Details are as follows.

The communications unit 303 may be further configured to directly send a BGP message to the BFIR and the BFER in the another BIER domain through the BGP connection, where the BGP message carries an intra PMSI A-D route used to advertise multicast information (for example, a multicast group address). The intra PMSI A-D route may carry a BIER identifier and an identifier of a multicast group corresponding to the multicast data (for example, a multicast group address 232.1.1.1). Herein, the BIER identifier is used to indicate that the BGP message carrying the intra PMSI A-D route is a BIER multicast message.

The communications unit 303 may be further configured to directly receive a BGP message from each of the first router 400 and the second router 500 in the another BIER domain through the BGP connection, where the BGP message carries a leaf A-D route.

To enable the third router 300 to know which BFERs in the BIER domain are interested in the multicast group and know how to forward the multicast data to the BFERs, the leaf A-D route may carry the following information.

First, the leaf A-D route fed back by the second router 500 in the another BIER domain may carry the BFR-id of the second router 500, a sub-domain to which the second router 500 belongs, the SI to which the BFR-id of the second router 500 belongs, a BSL supported by the second router 500, and an identifier of a BIER domain to which the second router 500 belongs. Specifically, a field used to carry the sub-domain, the SI, the BSL, and the BFR-id may be added to the leaf A-D route, and an extended community attribute ("Source-AS extended community") is enabled to indicate the identifier of the BIER domain. In this way, the third router 300 can determine a BIFT-id based on the three parameters: the sub-domain, the SI, and the BSL, and can determine a bitstring based on the BFR-id. Then, the third router 300 can generate the first mapping table based on the identifier of the BIER domain, the BIFT-id, and the bitstring.

In a possible case, one BIER domain is configured with only one sub-domain. In this case, the BIFT-id may be determined based on only the two parameters the SI and the BSL. Therefore, the leaf A-D route fed back by the second router 500 in the another BIER domain does not need to carry the sub-domain to which the second router 500 belongs.

In a possible case, BSLs supported by entire multicast domains may be the same, that is, no additional notification is required, and the third router 300 also knows the BSL. Therefore, the leaf A-D route fed back by the second router 500 in the another BIER domain does not need to carry the BSL.

Second, the leaf A-D route fed back by the first router 400 in the another BIER domain may carry a BFR-prefix of the first router 400 and the identifier of the BIER domain to which the first router 400 belongs. In this way, the third router 300 can generate the second mapping table based on the information.

It can be seen that edge BFRs between different BIER domains establish a BGP peer, and can directly exchange a BGP message through a BGP connection, to implement fast advertisement and fast feedback of the multicast information. In other words, multicast information advertisement and feedback do not require segment-by-segment BGP message exchange any more, but the BGP message is directly exchanged across domains. Therefore, a convergence time of the multicast advertisement and feedback is significantly shortened, and efficiency is high.

It may be understood that for specific implementation of each functional unit of the third router 300, refer to the method embodiment corresponding to FIG. 14A and FIG. 14B or FIG. 24A and FIG. 24B. Details are not described herein.

As shown in FIG. 26, the first router 400 may include a processing unit 401 and a communications unit 403.

The communications unit 403 may be configured to receive the labeled BIER data packet sent by the third router 300, where the label is a label corresponding to a prefix of the first router 400, the BIER data packet is obtained by the third router 300 by encapsulating the multicast data, the BIER header of the BIER data packet includes a BIFT-id and a bitstring that correspond to the multicast data in another BIER domain. The BIFT-id is determined based on at least the SI to which the BFR-id of the second router 500 belongs and the bitstring length supported by the second router 500, and the bitstring is determined based on at least the BFR-id of the second router 500. The second router 500 is a BFER in the another BIER domain that is configured to receive the multicast data.

The processing unit 401 may be configured to remove the label to obtain the BIER data packet, and obtain the BIFT-id and the bitstring from the BIER header of the BIER data packet.

The communications unit 403 may be further configured to forward the BIER data packet to the second router 500 based on the BIFT indicated by the BIFT-id and the bitstring.

Herein, the another BIER domain is a BIER domain in which the third router 300 is not located. The label may be an MPLS label or a GRE label.

In some optional embodiments, the BIFT-id that corresponds to the multicast data in the another BIER domain is further determined based on the sub-domain to which the second router 500 belongs. Optionally, in a possible case, one BIER domain is configured with only one sub-domain. In this case, the BIFT-id may be determined based on only the two parameters the SI and the BSL. Therefore, the leaf A-D route fed back by the second router 500 does not need to carry the sub-domain to which the BFER belongs.

In some optional embodiments, the third router 300 and the first router 400 form BGP peers. The communications unit 403 may be further configured to receive, through the BGP connection, a first BGP message sent by the third router 300, where an intra PMSI A-D route carried in the first BGP message includes the BIER identifier and the identifier of the multicast group corresponding to the multicast data. Correspondingly, the communications unit 403 may be further configured to send a second BGP message to the third router 300 through the BGP connection, where a leaf A-D route carried in the second BGP message includes the prefix of the first router 400 and the identifier of the BIER domain in which the first router 400 is located. In this way, the third router 300 can generate the second mapping table based on the information. For details, refer to related content described in the first aspect.

It may be understood that for specific implementation of each functional unit of the first router 400, refer to the method embodiment corresponding to FIG. 14A and FIG. 14B or FIG. 24A and FIG. 24B. Details are not described herein.

As shown in FIG. 26, the second router 500 may include a processing unit 501 and a communications unit 403.

The communications unit 503 may be configured to receive the BIER data packet sent by the third router 300, where the BIER data packet is obtained by the third router 300 by encapsulating the multicast data, the BIER header of the BIER data packet includes a BIFT-id and a bitstring that correspond to the multicast data in another BIER domain.

The BIFT-id is determined based on at least the SI to which the BFR-id of the second router 500 belongs and the bitstring length supported by the second router 500, and the bitstring is determined based on at least the BFR-id of the second router 500. The second router 500 is a BFER in the another BIER domain that is configured to receive the multicast data.

The processing unit 501 may be configured to decapsulate the BIER data packet to obtain the multicast data.

The communications unit 503 may be further configured to send the multicast data to a user-side device.

Herein, the another BIER domain is a BIER domain in which the third router 300 is not located. The label may be an MPLS label or a GRE label.

In some optional embodiments, the third router 300 and the second router 500 form BGP peers. The communications unit 503 may be further configured to receive, through the BGP connection, the first BGP message sent by the third router 300, where the intra PMSI A-D route carried in the first BGP message includes the BIER identifier and the identifier of the multicast group corresponding to the multicast data. Correspondingly, the communications unit 503 may be further configured to send the second BGP message to the third router 300 through the BGP connection, where the leaf A-D route carried in the second BGP message includes the BFR-id of the second router 500, the SI to which the BFR-id of the second router 500 belongs, and the identifier of the another BIER domain. In this way, the third router 300 can generate the first mapping table based on the information. For details, refer to related content described in the first aspect.

In some optional embodiments, the BIFT-id that corresponds to the multicast data in the another BIER domain is further determined based on the sub-domain to which the second router 500 belongs. Optionally, the leaf A-D route fed back by the second router 500 may further carry the sub-domain to which the second router 500 belongs. In other words, the leaf A-D route carried in the second BGP message may further include the sub-domain to which the second router 500 belongs. Optionally, in a possible case, one BIER domain is configured with only one sub-domain. In this case, the BIFT-id may be determined based on only the two parameters the SI and the BSL. Therefore, the leaf A-D route fed back by the second router 500 does not need to carry the sub-domain to which the BFER belongs.

In some optional embodiments, the leaf A-D route carried in the second BGP message may further include the BSL supported by the second router 500. Optionally, BSLs supported by entire multicast domains may be the same, that is, no additional notification is required, and the third router 300 also knows the BSL. Therefore, the leaf A-D route fed back by the second router 500 does not need to carry the BSL.

It may be understood that for specific implementation of each functional unit of the second router 500, refer to the method embodiment corresponding to FIG. 14A and FIG. 14B or FIG. 24A and FIG. 24B. Details are not described herein.

In conclusion, by implementing the technical solutions provided, a convergence time of multicast transmission can be significantly shortened, and timeliness of multicast transmission is improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method implemented by a first bit-forwarding ingress router (BFIR) in a first bit index explicit replication (BIER) domain, the method comprising:
   determining a bitstring and a bit index forwarding table identifier (BIFT-id) that correspond to multicast data in a second BIER domain, wherein the BIFT-id is based on a subset identifier (SI) to which a bit-forwarding router identifier (BFR-id) of a first bit-forwarding egress router (BFER) belongs and a bitstring length supported by the first BFER, wherein the bitstring is based on the BFR-id, and wherein the first BFER is in the second BIER domain and is for receiving the multicast data;
   encapsulating the multicast data into a BIER data packet, wherein the BIER data packet comprises a BIER header, and wherein the BIER header comprises the BIFT-id and the bitstring;
   labeling the BIER data packet with a label to create a labeled BIER data packet, wherein the label corresponds to a prefix of a second BFIR in the second BIER domain;
   sending the labeled BIER data packet to the second BFIR;
   sending, to a BFIR and a BFIR in the second BIER domain and through a Border Gateway Protocol (BGP) connection a first BGP message comprising an intra P-multicast service interface auto-discovery (PMSI A-D) route, wherein the intra PMSI A-D route comprises a BIER identifier and a first identifier of a multicast group corresponding to the multicast data; and
   receiving, liom the second BFIR and through the BGP connection, a second BGP message comprising a first leaf auto-discovery (A-D) route, wherein the first leaf A-D route comprises the prefix and a second identifier of the second BIER domain.

2. The method of claim 1, further comprising further determining the bitstring and the BIFT-id from a first mapping table comprising the BIFT-id and the bitstring that correspond to the multicast data in at least one BIER domain.

3. The method of claim 1, wherein before labeling the BIER data packet, the method further comprises determining a prefix of a logical next hop of the first BFIR in the second BIER domain, wherein the logical next hop is the second BFIR.

4. The method of claim 3, further comprising further determining the prefix from a second mapping table comprising the BIFT-id and the prefix, wherein the prefix corresponds to the BIFT-id.

5. The method of claim 1, furhter comprising receiving, from the first BFER and through the BGP connection, a third BGP message comprising a second leaf A-D route, wherein the second leaf A-D route comprises the BFR-id, the SI, and the second identifier.

6. The method of claim 5, wherein the second leaf A-D route further comprises a sub-domain to which the first BFER belongs.

7. The method of claim 5, wherein the second leaf A-D route further comprises the bitstring length.

8. The method of claim 1, wherein the BIFT-id is further based on a sub-domain to which the first BFER belongs.

9. A method implemented by a first bit-forwarding ingress router (BFIR) in a first bit index explicit replication (BIER) domain, the method comprising:
> receiving, from a second BFIR in a second BIER domain, a labeled BIER data packet comprising a label corresponding to a prefix of the first BFIR;
> removing the label to obtain a BIER data packet comprising multicast data and a BIER header, wherein the BIER header comprises a bitstring and a bit index forwarding table identifier (BIFT-id) that correspond to the multicast data in the first BIER domain, wherein the BIFT-id is based on a subset identifier (SI) to which a bit-forwarding router identifier (BFR-id) of a first bit-forwarding egress router (BFER) belongs and a bitstring length supported by the first BFER, wherein the bitstring is based on the BFR-id, and wherein the first BFER is in the second BIER domain and is for receiving the multicast data;
> obtaining the BIFT-id and the bitstring from the BIER header;
> forwarding the BIER data packet to the first BFER based on the bitstring and a BIFT indicated by the BIFT-id;
> receiving, from the second BFIR and through a Border Gateway Protocol (BGP) connection, a first BGP message comprising an intra P-multicast service interface auto-discovery (PMSI A-D) route, wherein the intra PMSI A-D route comprises a BIER identifier and a first identifier of a multicast group corresponding to the multicast data; and
> sending, to the second BFIR, through the BGP connection, and in response to the first BGP message, a second BGP message comprising a leaf auto-discovery (A-D) route, wherein the leaf A-D route comprises the prefix and a second identifier of the first BIER domain.

10. The method of claim 9, wherein the BIFT-id is further based on a sub-domain to which the first BFER belongs.

11. A method implemented by a first bit-forwarding egress router (BFER) in a first bit index explicit replication (BIER) domain, the method comprising:
> receiving, from a second BFIR in a second BIER domain and through a border gateway protocol (BGP) connection, a first BGP message comprising an intra P-multicast service interface auto-discovery (PMSI A-D) route, wherein the intra PMSI A-D route comprises a BIER identifier and a first identifier of a multicast group corresponding to multicast data;
> sending, to the second BFIR through the BGP connection, a second BGP message comprising a leaf auto-discovery (A-D) route, wherein the leaf A-D route comprises a bit-forwarding router identifier (BFR-id) of the first BFER, an SI to which the BFR-id belongs, and a second identifier of the first BIER domain;
> receiving, from a first BFIR in the first BIER domain, a BIER data packet;
> decapsulating the BIER data packet to obtain the multicast data and a BIER header, wherein the BIER header comprises a bitstring and a bit index forwarding table identifier (BIFT-id) that correspond to the multicast data in the first BIER domain, wherein the BIFT-id is based on a subset identifier (SI) to which the BFR-id belongs and a bitstring length supported by the first BFER, and wherein the bitstring is based on the BFR-id; and
> sending the multicast data to a user-side device.

12. The method of claim 11, wherein the leaf A-D route further comprises a sub-domain to which the first BFER belongs.

13. The method of claim 11, wherein the leaf A-D route further comprises the bitstring length.

14. The method of claim 11, wherein the BIFT-id is further based on a sub-domain to which the first BFER belongs.

15. A first bit-forwarding ingress router (BFIR) in a first bit index explicit replication (BIER) domain and comprising:
> a memory configured to store instructions; and
> a processor coupled to the memory and configured to execute the instructions to cause the first BFIR to:
>> determine a bitstring and a bit index forwarding table identifier (BIFT-id) that correspond to multicast data in a second BIER domain, wherein the BIFT-id is based on a subset identifier (SI) to which a bit-forwarding router identifier (BFR-id) of a first bit-forwarding egress router (BFER) belongs and a bitstring length supported by the first BFER, wherein the bitstring is based on the BFR-id, and wherein the first BFER is in the second BIER domain and is for receiving the multicast data;
>> encapsulate the multicast data into a BIER data packet, wherein the BIER data packet comprises a BIER header, and wherein the BIER header comprises the BIFT-id and the bitstring;
>> label the BIER data packet with a label to create a labeled BIER data packet, wherein the label corresponds to a prefix of a second bit-forwarding ingress router (BFIR) in the second BIER domain;
>> send the labeled BIER data packet to the second BFIR;
>> send, to a BFIR and a BFER in the second BIER domain and through a Border Gateway Protocol (BGP) connection, a first BGP message comprising an intra P-multicast service interface auto-discovery (PMSI A-D) route, wherein the intra PMSI A-D route comprises a BIER identifier and first identifier of a multicast group corresponding to the multicast data; and
>> receive, from the second BFIR and through the BGP connection, a second BGP message comprising a first leaf auto-discovery (A-D) route, wherein the first leaf A-D route comprises the prefix and a second iden.tifier of the second BIER domain.

16. The first BFIR of claim 15, wherein the processor is further configured to execute the instructions to cause the first BFIR to further determine the bitstring and the BIFT-id from a first mapping table comprising the BIFT-id and the bitstring that correspond to the multicast data in at least one BIER domain.

17. The first BFIR of claim 15, wherein before labeling the BIER data packet, the processor is further configured to execute the instructions to cause the first BFIR to determine a prefix of a logical next hop of the first BFIR in the second BIER domain, wherein the logical next hop is the second BFIR.

18. A first bit-forwarding ingress router (BFIR) in a first bit index explicit replication (BIER) domain and comprising:
> a memory configured to store instructions; and
> a processor coupled to the memory and configured to execute the instructions to cause the first BFIR to:
>> receive, from a second BFIR in a second BIER domain, a labeled BIER data packet comprising a label corresponding to a prefix of the first BFIR;
>> remove the label to obtain a BIER data packet comprising multicast data and a BIER header, wherein the BIER header comprises a bitstring and a bit index forwarding table identifier (BIFT-id) that correspond to the multicast data in the first BIER domain, wherein the BIFT-id is based on a subset identifier (SI) to which a bit-forwarding router identifier (BFR-id) of a first bit-forwarding egress router (BFER) belongs and a bitstring length supported by the first BFER, wherein the bitstring is based on the BFR-id, and wherein the first BFER is in the second BIER domain and is for receiving the multicast data;

obtain the BIFT-id and the bitstring from the BIER header;

forward the BIER data packet to the first BFER based on the bitstring and a BIFT indicated by the BIFT-id;

receive, from the second BFIR and through a Border Gateway Protocol (BGP) connection, a first BGP message comprising an intra P-multicast service interface auto-discovery (PMSI A-D) route, wherein the intra PMSI A-D route comprises a BIER identifier and a first identifier of a multicast group corresponding to the multicast data; and send, to the second BFIR, through the BGP connection, and in response to the first BGP message, a second BGP message comprising a leaf auto-discovery (A-D) route, wherein the leaf A-D route comprises the prefix and a second identifier of the first BIFR domain.

19. The first BFIR of claim 18, wherein the BIFT-id is further based on a sub-domain to which the first BFER belongs.

20. A first bit-forwarding egress router (BFER) in a first bit index explicit replication (BIER) domain and comprising:

a memory configured to store instructions; and a processor coupled to the memory and configured to execute the instructions to cause the first BFER to:

receive, from a second BFIR in a second BIER domain and through a border gateway protocol (BGP) connection, a first BGP message comprising an intra P-multicast service interface auto-discovery (PMSI A-D) route, wherein the intra PMSI A-D route comprises a BIER identifier and a first identifier of a multicast group corresponding to multicast data;

send, to the second BFIR through the BGP connection, a second BGP message comprising a leaf auto-discovery (A-D) route, wherein the leaf A-D route comprises a bit-forwarding router identifier (BFR-id) of the first BFER, an SI to which the BFR-id belongs, and a second identifier of the first BIER domain;

receive, from a first BFIR in the first BIER domain, a BIER data packet;

decapsulate the BIER data packet to obtain the multicast data and a BIER header, wherein the BIER header comprises a bitstring and a bit index forwarding table identifier (BIFT-id) that correspond to the multicast data in the first BIER domain, wherein the BIFT-id is based on a subset identifier (SI) to which the BIFT-id belongs and a bitstring length supported by the first BFER, and wherein the bitstring is based on the BFR-id; and send the multicast data to a user-side device.

* * * * *

UNITED STATES PATENT AND TRADEMARK OFFICE
CERTIFICATE OF CORRECTION

PATENT NO. : 11,616,656 B2
APPLICATION NO. : 17/090616
DATED : March 28, 2023
INVENTOR(S) : Nu Xia et al.

It is certified that error appears in the above-identified patent and that said Letters Patent is hereby corrected as shown below:

In the Claims

Claim 1, Column 34, Line 29: "BFIR and a BFIR in the" should read "BFIR and a BFER in the"

Claim 1, Column 34, Line 37: "receiving, liom the second" should read "receiving, from the second"

Claim 15, Column 36, Line 43: "iden.tifier of" should read "identifier of"

Claim 18, Column 37, Line 24: "the first BIFR" should read "the first BIER"

Signed and Sealed this
Thirtieth Day of May, 2023

Katherine Kelly Vidal
*Director of the United States Patent and Trademark Office*